United States Patent
Julian et al.

(10) Patent No.: US 11,453,365 B2
(45) Date of Patent: Sep. 27, 2022

(54) RECORDING VIDEO OF AN OPERATOR AND A SURROUNDING VISUAL FIELD

(71) Applicant: NETRADYNE, INC., San Diego, CA (US)

(72) Inventors: David Jonathan Julian, San Diego, CA (US); Sandeep Pandya, San Diego, CA (US); Adam David Kahn, San Diego, CA (US); Michael Campos, San Diego, CA (US); Avneesh Agrawal, San Diego, CA (US); Venkata Sreekanta Reddy Annapureddy, San Diego, CA (US); Lance Steven Hetherington, San Diego, CA (US); Tejeswara Rao Gudena, San Diego, CA (US); Suresh Babu Yanamala, San Diego, CA (US); Arun Valiaparambil, San Diego, CA (US)

(73) Assignee: NETRADYNE, INC., San Diego, CA (US)

(*) Notice: Subject to any disclaimer, the term of this patent is extended or adjusted under 35 U.S.C. 154(b) by 740 days.

(21) Appl. No.: 16/322,438

(22) PCT Filed: Aug. 25, 2017

(86) PCT No.: PCT/US2017/048756
§ 371 (c)(1),
(2) Date: Jan. 31, 2019

(87) PCT Pub. No.: WO2018/039646
PCT Pub. Date: Mar. 1, 2018

(65) Prior Publication Data
US 2021/0370879 A1 Dec. 2, 2021

Related U.S. Application Data

(60) Provisional application No. 62/457,064, filed on Feb. 9, 2017, provisional application No. 62/380,342, filed on Aug. 26, 2016.

(51) Int. Cl.
*B60R 25/25* (2013.01)
*B60R 11/04* (2006.01)
(Continued)

(52) U.S. Cl.
CPC ............ *B60R 25/257* (2013.01); *B60R 11/04* (2013.01); *B60R 25/24* (2013.01); *G06V 20/59* (2022.01);
(Continued)

(58) Field of Classification Search
CPC .................................................... B60R 25/257
See application file for complete search history.

(56) References Cited

U.S. PATENT DOCUMENTS 7,864,029 B2 * 1/2011 Huang ................ B60R 25/2081
340/426.1
8,103,402 B2 1/2012 Kozlay
(Continued)

FOREIGN PATENT DOCUMENTS

CN 110228439 A * 9/2019 ........ B60W 50/0098
JP 2008-009761 1/2008

OTHER PUBLICATIONS

PCT Patent Application No. PCT/US2017/13062, entitled "Driver Behavior Monitoring", filed Jan. 11, 2017.
(Continued)

*Primary Examiner* — Redhwan K Mawari
(74) *Attorney, Agent, or Firm* — Foley & Lardner LLP

(57) ABSTRACT

Systems and methods are provided for recording video of a driver in a vehicle and a surrounding visual field of the driver. The system includes a detachable body coupled to a windshield of a vehicle. The system further includes three or more cameras coupled to the detachable body. The three or more cameras are configured to capture surrounding views from the detachable body. One of the three or more cameras
(Continued)

faces a driver seat of the vehicle in response to the detachable body being coupled to the windshield of the vehicle. The video may be processed by the system, the cloud, or a combination of them.

21 Claims, 17 Drawing Sheets

(51) Int. Cl.
 *B60R 25/24* (2013.01)
 *G06V 20/59* (2022.01)
 *G06V 40/16* (2022.01)

(52) U.S. Cl.
 CPC .......... *G06V 40/166* (2022.01); *G06V 40/172* (2022.01)

(56) References Cited

U.S. PATENT DOCUMENTS

| | | | |
|---|---|---|---|
| 8,989,820 B2* | 3/2015 | Czaja | H04W 48/04 |
| | | | 455/552.1 |
| 9,082,237 B2* | 7/2015 | Breed | B60R 25/25 |
| 9,117,318 B2* | 8/2015 | Ricci | G06Q 10/00 |
| 9,315,151 B2 | 4/2016 | Taylor et al. | |
| 9,619,203 B2* | 4/2017 | Tamir | G08G 1/096775 |
| 10,410,075 B2* | 9/2019 | Zebley | G06K 9/00892 |
| 10,534,819 B2* | 1/2020 | Ricci | G06Q 30/0639 |
| 11,068,731 B2* | 7/2021 | Siboni | G06V 20/56 |
| 2008/0186701 A1* | 8/2008 | Omi | G06V 40/19 |
| | | | 362/231 |
| 2008/0291008 A1* | 11/2008 | Jeon | G06V 10/95 |
| | | | 340/539.1 |
| 2009/0284359 A1* | 11/2009 | Huang | B60R 25/24 |
| | | | 340/426.1 |
| 2011/0278439 A1* | 11/2011 | Heslin | B60R 11/02 |
| | | | 250/215 |
| 2013/0086674 A1* | 4/2013 | Horvitz | H04L 9/3231 |
| | | | 726/19 |
| 2013/0167207 A1* | 6/2013 | Davis | G06F 21/316 |
| | | | 726/5 |
| 2014/0111647 A1 | 4/2014 | Atsmon et al. | |
| 2014/0306799 A1* | 10/2014 | Ricci | H04W 12/088 |
| | | | 340/5.83 |
| 2015/0183372 A1 | 7/2015 | Lambert et al. | |
| 2015/0251605 A1* | 9/2015 | Uken | B60R 19/46 |
| | | | 248/467 |
| 2015/0323993 A1* | 11/2015 | Levesque | G06F 3/016 |
| | | | 345/156 |
| 2016/0225203 A1 | 8/2016 | Asmar et al. | |
| 2016/0371551 A1 | 12/2016 | Atsmon et al. | |
| 2017/0001565 A1* | 1/2017 | Nakano | G06K 9/00812 |
| 2017/0200061 A1 | 7/2017 | Julian et al. | |
| 2017/0279957 A1* | 9/2017 | Abramson et al. | G06F 21/36 |

OTHER PUBLICATIONS

International Search Report issued in International Application No. PCT/US2017/048756 dated Nov. 20, 2017.
Written Opinion of the International Searching Authority issued in PCT/US2017/048756 dated Nov. 20, 2017.
Chinese Office Action issued in CN Appl. Sr. No. 201780066337.4 dated Jun. 25, 2021 (18 pages).
Indian Office Action issued in IN Appl. Ser. No. 201947011501 dated Apr. 15, 2021 (6 pages).
Communication pursuant to Article 94(3) EPC issued in corresponding European Application No. 17844546.6 dated Sep. 9, 2020, 8 pages.
First Chinese Office Action issued in CN 201780066337.4 dated Nov. 23, 2020.
European Search Report, dated Dec. 12, 2019, issued in corresponding European Application No. 17844546.6, 13 pages.
Decision of Rejection for CN 201780066337.4 dated Jan. 6, 2022 (22 pages).
Foreign Search Report on EP Appl. Ser. No. 22155167.4 dated Jun. 29, 2022 (8 pages).

\* cited by examiner

RECORDING VIDEO OF AN OPERATOR AND A SURROUNDING VISUAL FIELD

CROSS-REFERENCE TO RELATED APPLICATIONS

The present application is a National Stage of PCT/US2017/048756, filed Aug. 25, 2017, which claims priority to U.S. Provisional Patent Application No. 62/380,342 filed Aug. 26, 2016, and U.S. Provisional Patent Application No. 62/457,064 filed Feb. 9, 2017, and all of which are incorporated by reference herein in their entirety.

BACKGROUND

Certain aspects of the present disclosure generally relate to internet-of-things (IOT) devices and applications, and more particularly, to devices, systems, and methods of modifying a video according to a desired privacy.

Internet-of-things (IOT) devices may include embedded machine vision. Embedded machine vision devices may be applied to, for example, intelligent driver monitoring systems (IDMS), advanced driving assistance systems (ADAS), autonomous driving systems, camera-based surveillance systems, smart cities, and the like. Some IDMS devices may capture a view of the visual scene directly in front of an operator (or a driver) of a vehicle, and a view of the operator.

SUMMARY

Various embodiments disclosed herein are related to an apparatus configured to modify a video. In one or more embodiments, the system includes a detachable body coupled to a windshield of a vehicle, and three or more cameras coupled to the detachable body. The three or more cameras are configured to capture surrounding views from the detachable body. One of the three or more cameras faces a driver seat of the vehicle in response to the detachable body being coupled to the windshield of the vehicle.

Various embodiments disclosed herein are related to a system for automatically verifying a driver in a vehicle. The system includes a body coupled to a windshield of the vehicle. The system further includes a plurality of cameras coupled to the body. The plurality of cameras are configured to capture surrounding views from the body. The system further includes a device verification processor coupled to the body. The device verification processor is configured to determine a device attribute indicative of a beacon device. The driver in the vehicle may have the beacon device. The system further includes a biometric verification processor coupled to the body. The biometric verification processor is configured to determine a personal attribute indicative of the driver. The system further includes a driver verifier coupled to the body. The driver verifier is configured to determine, based on the device attribute and the personal attribute, whether the driver is an authorized driver of the vehicle. The system further includes a message generator coupled to the body. The message generator is configured to transmit an electronic message indicating whether the driver is the authorized driver of the vehicle.

In one or more embodiments, one of the plurality of cameras captures an image of the driver in the vehicle.

In one or more embodiments, the system further includes a face detector communicatively coupled to the one of the cameras and the biometric verification processor. The face detector may be configured to detect a face of the driver in the image of the driver. The personal attribute may comprise the detected face of the driver.

In one or more embodiments, the driver verifier is configured to determine whether the detected face of the driver matches any one of face images of a plurality of authorized drivers through face recognition.

In one or more embodiments, in response to determining that the detected face of the driver does not match any one of the face images of the plurality of authorized drivers, the driver verifier is configured to identify a candidate driver authorized to have the beacon device based on the device attribute, and determine whether the detected face of the driver matches a face image of the candidate driver through face verification.

In one or more embodiments, the face verification analyzes more number of features of the face of the driver in the image than the face recognition.

In one or more embodiments, the face verification is performed in response to determining that the vehicle moves over a predetermined speed.

In one or more embodiments, in response to determining that the detected face of the driver matches the face image of the candidate driver, the driver verifier is configured to update a database to add the image of the driver to the face images of the plurality of authorized drivers.

In one or more embodiments, in response to determining that the detected face of the driver does not match the face image of the candidate driver, the message generator is configured to transmit, to a remote server, the electronic message indicating an unauthorized driver operating the vehicle.

In one or more embodiments, the system further includes a voice detector communicatively coupled to the biometric verification processor. The voice detector may be configured to detect a voice of the driver in the vehicle. The personal attribute may comprise the detected voice of the driver.

In one or more embodiments, the device verification processor includes a QR code detector to detect a QR code of the beacon device to determine the device attribute.

In one or more embodiments, the device verification processor comprises a wireless transceiver to detect an encoded wireless signal from the beacon device to determine the device attribute.

In one or more embodiments, the body comprises a detachable mount to couple or decouple the body from the windshield.

Various embodiments disclosed herein are related to a method of automatically verifying a driver in a vehicle. The method includes determining a personal attribute indicative of the driver in the vehicle. The method further includes determining a device attribute indicative of a beacon device. The driver in the vehicle may have the beacon device. The method further includes determining based on the device attribute and the personal attribute, whether the driver is an authorized driver of the vehicle. The method further includes transmitting an electronic message indicating whether the driver is the authorized driver of the vehicle.

In one or more embodiments, the method further includes detecting a face of the driver in an image of the driver in the vehicle, and determining whether the detected face of the driver matches any one of face images of a plurality of authorized drivers through face recognition.

In one or more embodiments, the method further includes identifying, in response to determining that the detected face of the driver does not match any one of the face images of the plurality of authorized drivers, a candidate driver authorized to have the beacon device based on the device attribute, and determining whether the detected face of the driver matches a face image of the candidate driver through face verification.

In one or more embodiments, the face verification analyzes more number of features of the face of the driver in the image than the face recognition.

In one or more embodiments, the method further includes updating, in response to determining that the detected face of the driver matches the face image of the candidate driver, a database to add the image of the driver to the face images of the plurality of authorized drivers.

In one or more embodiments, the method further includes transmitting, to a remote server, the electronic message indicating an unauthorized driver operating the vehicle, in response to determining that the detected face of the driver does not match the face image of the candidate driver.

Various embodiments disclosed herein are related to a method of modifying a video. The method includes selecting a triggering event, a desired privacy mode, and a portion of a field of view. The method further includes receiving a first video data of the video at a first device. The method further includes determining whether the selected triggering event has occurred. The method further includes modifying the selected portion of the field of view of the first video data according to the selected desired privacy mode.

In one or more embodiments, the video comprises a plurality of video streams. The selected portion of the field of view may comprise a portion of the field of view of a first video stream of the plurality of video streams.

In one or more embodiments, the first video stream corresponds to a first camera. The first field of view of the first camera may comprise a first portion of an interior of a vehicle. The selected desired privacy mode may correspond to disabling the selected portion of the field of view. The selected triggering event may correspond to the end of a period of driving.

In one or more embodiments, the method further includes receiving a sensor data. The sensor data may comprise a speed of the vehicle, an acceleration of the vehicle, a location of the vehicle, or some combination thereof. Determining whether the triggering event has occurred may be based on the sensor data.

In one or more embodiments, the method further includes selecting a second triggering event and a second desired privacy mode. The selected second desired privacy mode may correspond to enabling the selected portion of the field of view. The selected second triggering event may correspond to the start of a period of driving.

In one or more embodiments, the selected portion of the video further comprises a portion of a second video stream of the plurality of video streams.

In one or more embodiments, the desired privacy mode comprises an indication of whether the modified portion should be stored in a memory.

In one or more embodiments, the selected desired privacy mode comprises an indication that the selected portion should not be modified, should be encrypted, should be obfuscated, or should be ignored.

In one or more embodiments, the method further includes processing a second portion of the video to produce a first inference data. The second portion may comprise the selected portion of the video. The selected desired privacy mode may comprise an indication that the selected portion should be replaced or augmented with the first inference data.

In one or more embodiments, the first inference data comprises a feature vector of a driver. The triggering event may be a detection that the feature vector does not match a feature vector stored in a memory of the first device.

In one or more embodiments, the method further includes processing a third portion of the video to produce a second inference data and associating the second inference data with the first inference data. The third portion may not comprise the selected portion of the field of view. The second inference data may comprise a driving score.

In one or more embodiments, the first inference data comprises an indication of whether a gaze of a driver is directed to the outside of a vehicle, whether the driver is holding an electronic device, whether the driver is wearing a seat-belt, or some combination thereof.

In one or more embodiments, the triggering event is selected from one of: a button press; a voice command; a presentation of a QR code or other image; a gesture; an input into a proximate electronic device by a driver of a vehicle; an input into a remote device by an associate of the driver of the vehicle; an entry into a geo-fenced location; an acceptance of a request for taxi service; an opening of a vehicle door; an entry of a passenger; an exit of a passenger; a change in the output of a weight sensor; a crossing into the driver's space by a passenger; a hard-stop by the vehicle, or a traffic violation.

In one or more embodiments, the method further includes indicating a time offset, determining a first time at which the triggering event has occurred, and determining a second time based on the first time and the time offset. Modifying the portion may be applied to the video starting at the second time.

In one or more embodiments, the method further includes selecting an object, and determining a location of the object in a video. The selecting a portion of a video may be based on the determined location of the object.

Various embodiments disclosed herein are related to an apparatus configured to modify a video. The apparatus comprises a memory unit, and at least one processor coupled to the memory unit. The at least one processor is configured to select a triggering event, a desired privacy mode, and a portion of a field of view. The at least one processor is further configured to receive a first video data of the video at a first device. The at least one processor is further configured to determine whether the selected triggering event has occurred. The at least one processor is further configured to modify the selected portion of the field of view of the first video data according to the selected desired privacy mode.

Various embodiments disclosed herein are related to an apparatus configured to modify a video. The apparatus comprises means for selecting a triggering event, a desired privacy mode, and a portion of a field of view. The apparatus further includes means for receiving a first video data of the video at a first device. The apparatus further includes means for determining whether the selected triggering event has occurred. The apparatus further includes means for modifying the selected portion of the field of view of the first video data according to the selected desired privacy mode.

Various embodiments disclosed herein are related to a computer program product for modifying a video. The computer program product includes a non-transitory computer-readable medium having program code recorded thereon. The program code, when executed by a processor, causes the processor to: select a triggering event, a desired privacy mode, and a portion of a field of view; receive a first video data of the video at a first device; determine whether the selected triggering event has occurred; and modify the selected portion of the field of view of the first video data according to the selected desired privacy mode.

The foregoing summary is illustrative and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGURE (FIG. 1 illustrates a block diagram of a device for capturing and/or modifying a video according to a desired privacy in accordance with certain aspects of the present disclosure.

Figure 1:
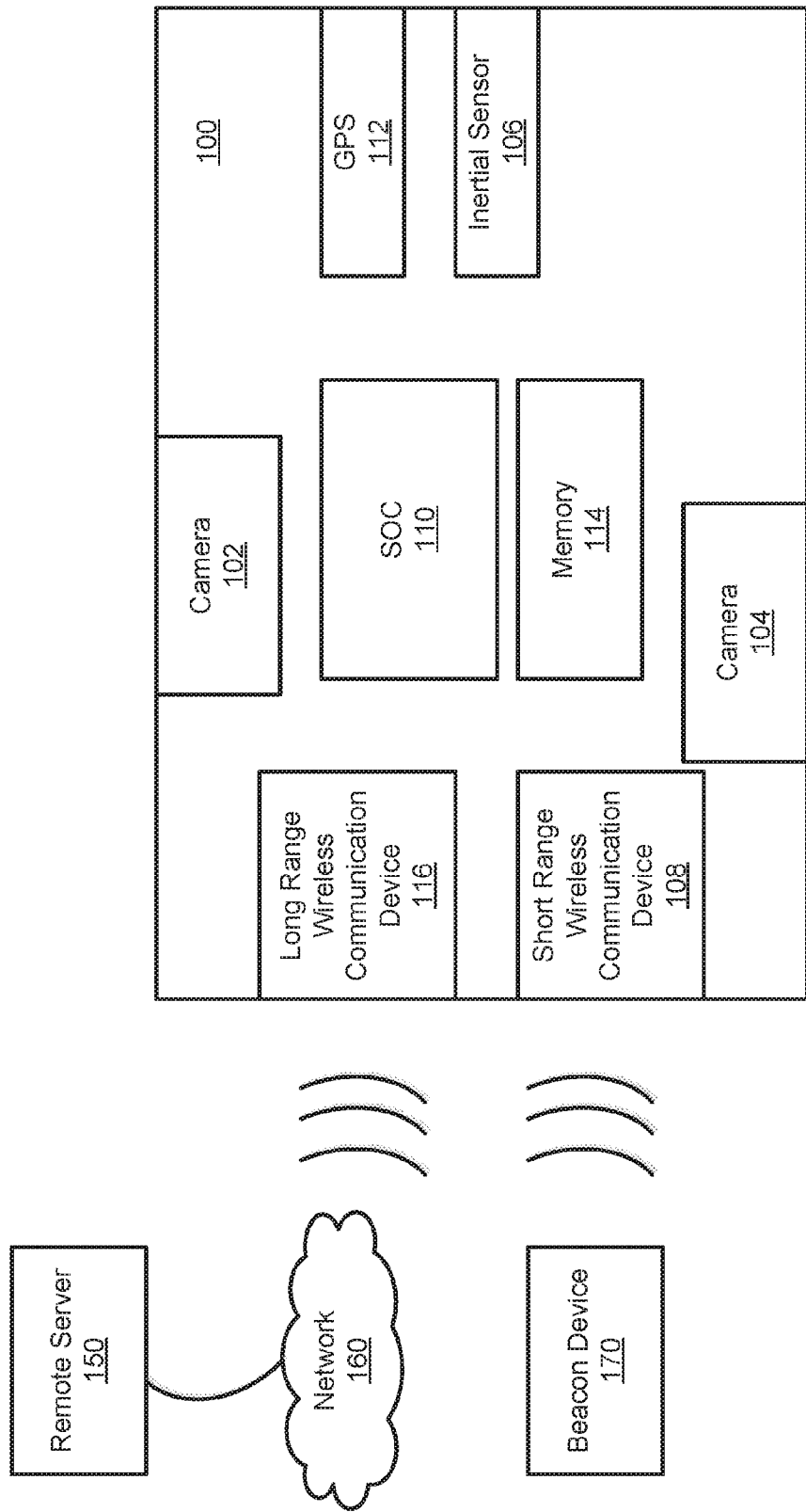

The foregoing and other features of the present disclosure will become apparent from the following description and appended claims, taken in conjunction with the accompanying drawings. Understanding that these drawings depict several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the FIGURES, can be arranged, substituted, combined, and designed in a wide variety of different configurations, all of which are explicitly contemplated and make part of this disclosure.

One aspect of the present disclosure is related to a device and a method of recording video of an operator (or a driver) of a vehicle and a surrounding visual field. The device may comprise a plurality of cameras to provide overlapping coverage of the visual field around the device. The device may provide a view of the driver of the vehicle as well as the visual field accessible from the point of view of the driver. The video may be automatically processed to analyze a driver's behavior in response to surroundings of the vehicle.

Another aspect of the present disclosure is related to a device and a method of automatically performing privacy screening of a video recorded within a vehicle. The device may modify the video according to a desired privacy. Privacy modifications may be applied to a portion of an image, a portion of a time interval, or a combination thereof, according to the desired privacy.

Another aspect of the present disclosure is related to a device and a method of automatically verifying a driver in the vehicle based on a device attribute of a beacon device and a personal attribute of the driver. The device attribute indicates distinctive features of the beacon device, where the personal attribute indicates distinctive features of the driver (e.g., biometric signatures). The device may obtain the device attribute of the beacon device worn or carried by the driver by detecting a QR code on the beacon device or detecting an encoded wireless signal (e.g., Bluetooth signal, radio frequency identification (RFID) signal, near field communication (NFC) signal, etc.) transmitted from the beacon device. In addition, the device may obtain the personal attribute of the driver through face recognition, face verification, speech recognition or a combination of them. Verifying the driver of the vehicle through the device attribute and the personal attribute enables improved accuracy and efficiency of confirming identity of the driver of the vehicle.

Throughout the disclosure, the disclosed system and method are described to be applied to an automobile such as a vehicle. However, the principle disclosed herein can be applied to other types of vehicles (e.g., aircraft, helicopter, ship, boat, etc.). Accordingly, a driver described herein may refer to an operator of any type of vehicle.

Monitoring and Characterization of Driver Behavior

Aspects of the present disclosure may be directed to monitoring and characterizing driver behavior, which may include determining cause of traffic events. Several methods of monitoring and characterizing driver behavior are contemplated, as described in PCT Patent Application No. PCT/US17/13062—"Driver Behavior Monitoring," filed Jan. 11, 2017, which is incorporated herein by reference in its entirety. A device in accordance with the present disclosure may enable determination of causation of a traffic incident, for example, if the driver being monitored failed to look over to a lane occupied by another vehicle before attempting a lane change.

Driver-I, a Vision-Based Platform

Certain aspects of the aforementioned devices and methods of recording video of an operator and a surrounding visual field may be applied to Commercial Vehicle Driver Safety. A vision-based platform that, according to certain aspects of the present disclosure, may enhance driver safety within the commercial vehicle market may be called driver-i. driver-i is a trademark of NetraDyne Inc.

driver-i may identify, recognize and/or reward positive driver performance. driver-i may empower fleet leaders by providing a surround view of daily events. The platform may be configured to capture substantially every moment and aspect of a driving experience. On-device and/or cloud analytics may enable substantially continuous processing of video streams. In contrast to devices that selectively process short and/or infrequent video samples, driver-i may deliver more insight and value to each driver, each fleet manager, the bottom line of a company, and the like.

The driver-i platform may be an end-to-end IoT system. It may comprise an intelligent mobile video analytics device and a cloud-based fleet safety management center. Additional device capabilities may include: a dedicated AI-Deep Learning processor that may perform a trillion calculations per second; a four camera video system offering a driver's perspective with a 360 degree field of view; and/or cellular module which may enable global coverage.

driver-i may include a fleet safety management center. In this example, the management center (or a remote server) may include an intuitive-to-use dashboard. In some configurations it may provide substantially real-time driver and vehicle safety event data. In some configurations, the driver and vehicle safety data may be crowd-sourced. In one embodiment, a management center may enable trend analysis and business intelligence, and may include triggers for organization wide work flow.

Reasoning and causality regarding everyday events such as: following distance, 'stale' traffic lights, and the action of other vehicles on the road, may be computed at the vehicle level. In this configuration, information may be inferred that may be timely and meaningful. For example, the driver-i platform may provide substantially complete visibility into a fleet. Through the application of artificial intelligence technology, computer vision technology, and the like, the system may identify and detect images throughout each route and may quickly analyze the impact of detected objects and events on a driver's workday.

driver-i may be configured to the needs of a commercial driver. Fleet managers may be provided with additional tools that build strong working relationships with drivers, helping to stabilize fleets, and having a positive impact on the bottom line. The driver-i's GreenZone™ Driver Score may provide fleets with an ability to see how drivers are tracking against team safety programs and goals. This view into driving behavior offers visibility into positive driving activity, events that were caused by third parties, and notification of at-risk conditions. Some configurations may enable a fleet manager to step in before those events become severe. The GreenZone utility may also be configured with performance-based push notifications so that fleet managers can pass along positive messages and rewards for excellent driving practices.

The driver-i platform may protect commercial vehicle drivers, which may be a fleet's most valuable asset. The driver-i platform may foster collaboration, recognition, and retention; all of which may have a positive influence on a fleet's bottom line.

The driver-i platform may provide fleets with a technology differentiator that analyzes and shares events as they are identified so that fleet managers do not have to wait hours or days to address a situation. Instead, driver-i may enable a fleet manager to have an immediate outcome on safety.

Privacy Concerns for Devices with Cameras

A device that captures video may raise privacy concerns. An IOT device with a camera may include automated means for receiving and/or transmitting data to other devices, which may escalate privacy concerns. Devices that are not configured to automatically transmit data may still raise privacy concerns, as they may capture data containing sensitive information that may be retrieved directly from the device by an unauthorized person.

Privacy concerns may be directed to devices that are stationary or non-stationary. A stationary IOT device, for example, may monitor a home or a place of business. A non-stationary IOT device may be embedded within a vehicle as part of an intelligent driver monitoring system (IDMS), an advanced driving assistance system (ADAS), an autonomous driving system, and the like.

Video data of captured videos may improve the usefulness of an IOT device. For example, a home security system may include an IOT device with an infrared sensor. In some configurations of the home security system, the IOT device with an infrared sensor may also have a video camera. Using the infrared sensor, the home security system may be able to determine when someone entered a home or a place of business. This information may be useful for establishing the time of a theft, for example. If the IOT also collected video data, however, the collected video information may be useful for establishing the identity of the thief as well.

A network of IOT devices with cameras may be used to track the movements of a person, such as a thief in the present example. An image of the thief captured at a first camera may be used as a template. Other video data captured at nearby cameras around the same time may then be queried to find a person matching the template. Similarly, the image of the thief may be used to determine if the thief had visited the same home or business previously, whether he had been involved in other crimes at other locations, or whether he may have recently exhibited behavior consistent with preparations for a future crime.

While video data may provide benefits, it may also raise privacy concerns. In some cases, the privacy concerns may outweigh the benefits. For example, a network of devices that may be used to identify and track a criminal, as per the previous example, may also be used to identify and track a child as he or she walks to and from school each day. In another example, an IOT device with a camera may be used to identify an elderly person, either as a specific person or as a member of a vulnerable population. One may imagine scenarios in which a video system that was intended to deter criminal activity might instead aid a criminal in executing a crime. For example, such a system might be used to predict when and where a vulnerable person may be alone and far from help. The potential for misuse of a connected camera system may be limited, but the concern about such misuse may still overshadow and/or outweigh beneficial uses.

Current methods of safeguarding against misuse of sensitive information in video data may include modifying a video, for example, using video editing software. These methods, however, may be costly, prone to error, and time-consuming. Accordingly, certain aspects of the present disclosure are directed to systems, devices, and methods for modifying a video according to a desired privacy. Modifications to video data may be applied in an automated manner so that the costs of applying a privacy mode to a portion of a video may be reduced. Furthermore, errors associated with an intended modification of a video may be reduced. As the cost of enabling privacy in video data is reduced and as the quality is increased, the beneficial uses of video data may be more fully realized.

Active Privacy

Active Privacy may refer to systems, devices, and methods that modify a video in response to a triggering event. Upon determining that the triggering event has occurred, the video may be modified according to a desired privacy mode. In some embodiments, a portion of the modified video may be left unmodified so that the device may continue to perform some other useful functions even when the video is modified.

Several examples of Active Privacy are presented herein. In some examples, a triggering event may be user initiated. A user initiated trigger may be a button press, an audio prompt, the presentation of a QR code, a hand gesture, and the like. In some examples, a triggering event may be autonomous. An autonomous trigger may be a detection of a specific driving event, such as a detection that a driver is driving over a predetermined speed or that the driver is swerving off the road. An autonomous trigger may also be a detection of a specific in-cab event, such as a detection of the absence or presence of passengers.

In some examples of Active Privacy, the modification of a video may refer to the execution of one or more privacy settings. In one example, a privacy setting may indicate that a camera should be disabled. In another example, a privacy setting may indicate that a certain part of the image should be disabled or blurred. A privacy setting that indicates that a camera should be disabled may correspond to cutting power to a camera. A privacy setting that indicates that a certain part of an image should be disabled or blurred may correspond to configuring a processor to modify pixel values captured by a camera.

In some examples of Active Privacy, a privacy setting may be enabled such that at least some vision-based functions may still be performed by the device. In one example, an inference may be automatically generated based on the captured video prior to the application of the Active Privacy modification. In this example, an enabled system may produce inferred information. In some embodiments, the system may not transmit the video data, but may provide the inferred data to other devices. In an IDMS, for example, inferred data may relate to a user state of drowsiness, distracted driving, cell phone usage, and the like. In some embodiments, the system may transmit the video data along with modified video data. In some embodiments, the system may not transmit video data by default, but may instead store video data locally so that it may be available for authorized queries at a later time.

In some embodiments, Active Privacy may be configured with non-causal exceptions. A non-causal exception may be considered a trigger corresponding to the removal of a privacy setting. For example, in an Active Privacy system configured with non-causal exceptions, all captured video may be modified according to a default privacy setting. Upon detecting an exception trigger, the captured video may be stored without modifications for a period of time around the triggering event. In one example, a video may be stored on a device in a manner that the video is not accessible by other devices except on certain triggers. In an IDMS example, an exception may be a driving alert, such as an accident, a high-G event, a severe traffic violation, and the like. In some embodiments, the exceptions may be specified according to a certain policy. In these examples, unmodified video may only be available around the times of triggering events.

In some embodiments, an exception may be triggered by a user (e.g., driver). In one example, a driver may provide permission to remove (un-do, reverse, etc.) privacy modifications of a video. For example, the driver may reverse privacy modifications associated with a video recording in the case of an accident for self-exoneration. Similarly, a supervisor may grant permission to access a modified video as per a certain policy, and the like.

Several systems, devices, and methods of modifying a video according to a desired privacy are provided herein.

Devices with Multiple Cameras

FIG. 1 illustrates an embodiment of a system 100 that may support multiple cameras 102, 104 in accordance with the aforementioned systems, devices, and methods of modifying a video according to a desired privacy. The system 100 may include input sensors (which may include a forward-facing camera 102, a backward-facing camera 104 (which may be referred to as an inward-facing camera or driver-facing camera when deployed in a vehicle), a right-ward facing camera (not shown for simplicity), a left-ward facing camera (not shown for simplicity), connections to other cameras that are not physically mounted to the device, inertial sensors 106, sensor data available from a data hub such as car OBD-II port sensor data if deployed in a vehicle (which may be obtained through a short range wireless communication device 108), and the like) and/or computing devices. The computing devices may be a CPU or an integrated System-on-a-chip (SOC) 110, which may include a CPU and other specialized compute cores, such as a graphics processor (GPU), gesture recognition processor, and the like.

In some embodiments, a connected device embodying certain aspects of the present disclosure may be a long range wireless communication device 116 (e.g., 1G, 2G, 3G, 4G (LTE), 5G communication device) and a short range wireless communication device 108 (e.g., Bluetooth communication device, near field communication device, radio frequency identification (RFID) communication device, etc.). The long range wireless communication device 116 allows a wireless connection between the system 100 and a remote server 150 through a network 160. The remote server 150 may be a computing device to oversee operations of multiple vehicles and drivers. The short range wireless communication device 108 allows a wireless connection between the system 100 and a beacon device 170 carried or worn by a driver. The system 100 may also include a global positioning system (GPS) device 112 that may be separate from the SOC 110 or integrated with the SOC 110. The SOC 110 may further include memory 114. In other embodiments, the system 100 includes fewer, more, or more components than shown in FIG. 1.

Figure 2A:
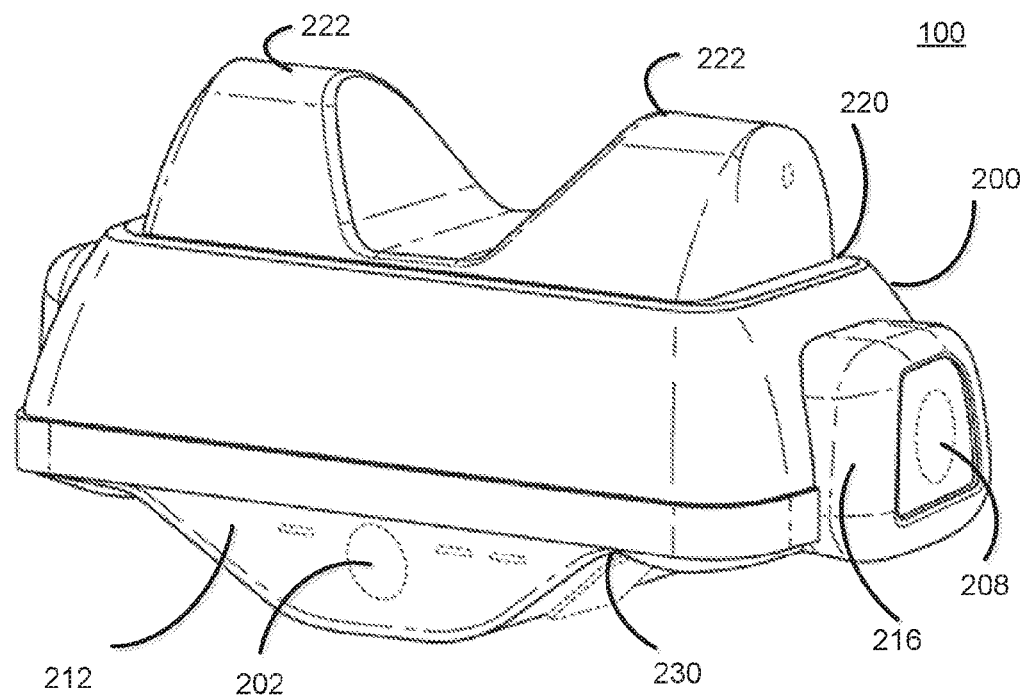
FIG. 2A illustrates a front perspective view of a system for capturing and/or modifying a video according to a desired privacy in accordance with certain aspects of the present disclosure.
Figure 2B:
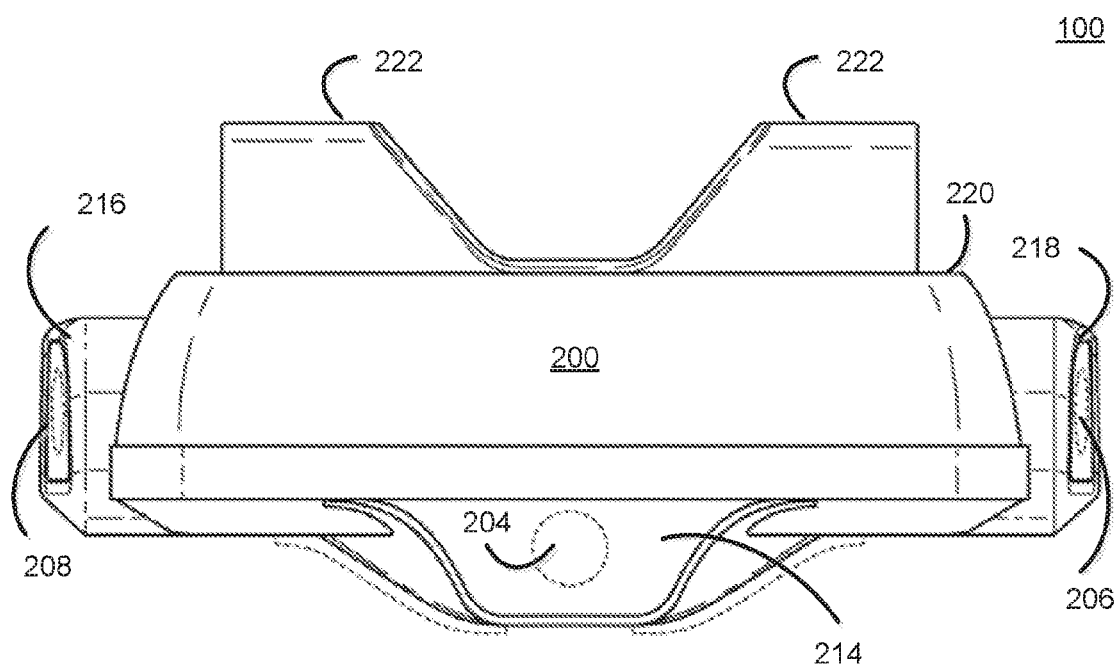
FIG. 2B illustrates a rear view of the system of FIG. 2A in accordance with certain aspects of the present disclosure.

FIG. 2A illustrates a front perspective view of the system 100 for capturing and/or modifying a video according to a desired privacy in accordance with certain aspects of the present disclosure. FIG. 2B illustrates a rear view of the system 100 of FIG. 2A in accordance with certain aspects of the present disclosure. In one embodiment, the system 100 includes a body 200, apertures 202, 204, 206, 208, and a mount 222. The cameras (or image sensors) may be located at corresponding apertures, and the body 200 may be coupled to a vehicle through the mount 222. In this configuration, when the system 100 is coupled to the vehicle, the system 100 can capture a view of the driver of the vehicle as well as the visual field accessible from the point of view of the driver. In other embodiments, the system 100 includes fewer, more, or different components than shown in FIG. 2.

The body 200 is a mechanical housing that covers cameras and other electronic components. In one aspect, the body 200 encloses electronic components such as long range wireless communication device 116, short range wireless communication device 108, SOC 110, memory 114, and other sensor devices 112, 106. The body 200 includes at least a top surface 220, a front surface 212, a rear surface 214, a first side surface 216, and a second side surface 218. In addition, the body 200 covers cameras, where each camera is located at a corresponding aperture. For example, the forward-facing camera 102 of FIG. 1 is located at an aperture 202 of the front surface 212; the backward-facing camera 104 of FIG. 1 is located at an aperture 204 of the rear surface 214; a first side-facing camera (not shown) is located at an aperture 206 of the first side surface 216; and a second side-facing camera (not shown) is located at an aperture 208 of the second side surface 218. Mount 222 is coupled to a top surface 220 of the body 200. The mount 222 may couple to (or decouple from) a corresponding mount on a windshield of a vehicle. In this configuration, the body 200 can be attached to or detached from the windshield. In other embodiments, the body 200 may be coupled to a different mount than shown in FIG. 2, and directly coupled to the windshield. In other embodiments, the body 200 may be coupled to a rear view mirror of the vehicle or integrated with the rear view mirror.

When the body 200 is mounted on the vehicle, the forward-facing camera 102 can capture images or videos of a road ahead of the vehicle through the aperture 202 to generate corresponding image data or video data. Similarly, the backward-facing camera 104 can capture images or videos of inside of the vehicle through the aperture 204 to generate corresponding image data or video data. The image data or the video data generated by the backward-facing camera 104 may be used, for example, to monitor the operator of a vehicle. In addition, the first side-facing camera can capture images or videos of a first side (e.g., right side) of the driver's point of view through the aperture 206 to generate corresponding image data or video data. Similarly, the second side-facing camera can capture images or videos of a second side (e.g., left side) of the driver's point of view through the aperture 208 to generate corresponding image data or video data. By aggregating different image data or video data from different point of views, a driver's behavior in response to surroundings of the vehicle may be determined.

Figure 3A:
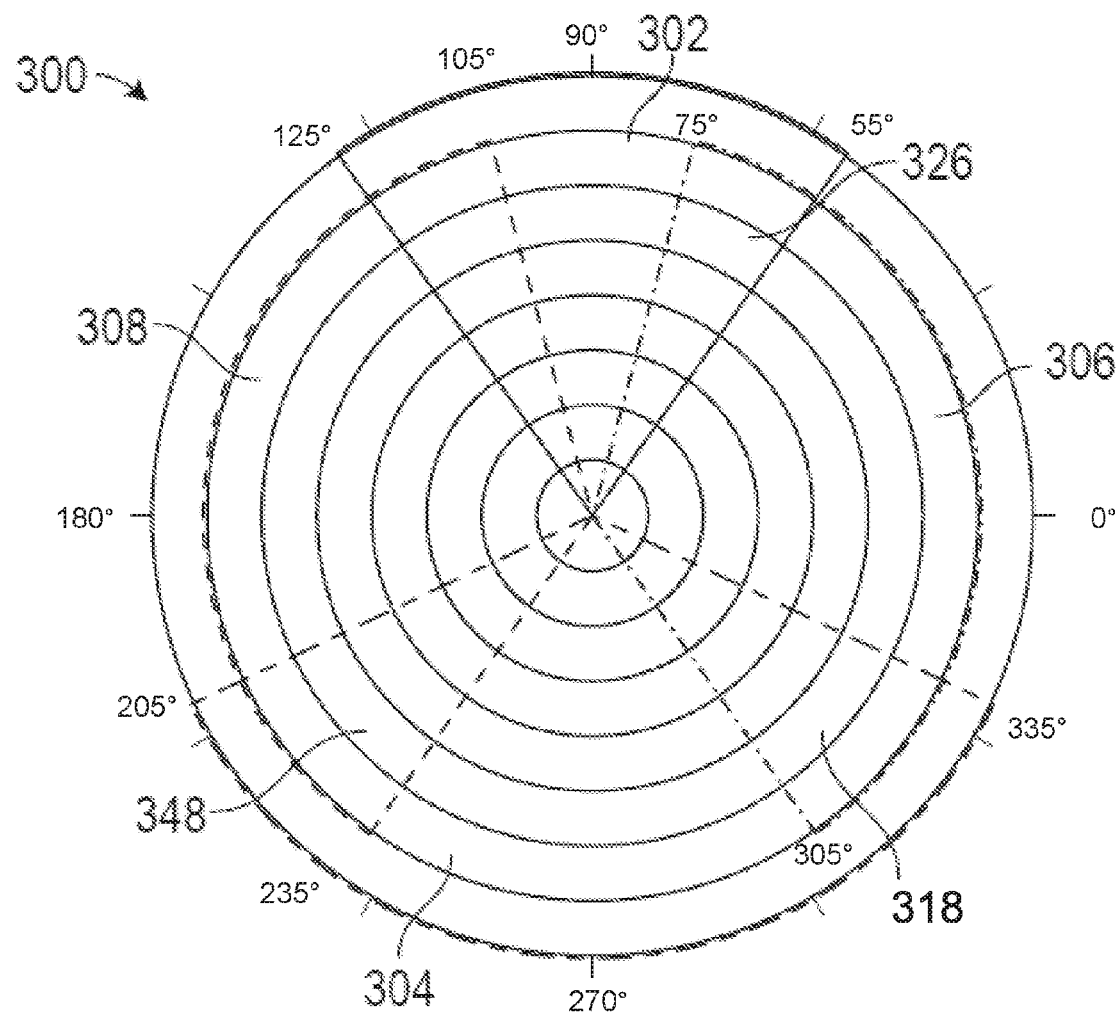
FIG. 3A illustrates an example of a visual field coverage of the system of FIG. 2A in accordance with certain aspects of the present disclosure.

FIG. 3A illustrates a set of four overlapping Field-of-View (FOV) regions associated with each of four cameras of a device (such as the device illustrated in FIGS. 2A and 2B) in accordance with the aforementioned devices, systems, and methods of modifying video according to a desired privacy. A FOV may be specified in horizontal and vertical degrees from an anchor point. In FIG. 3A, '0' degrees may be used to indicate the horizontal direction directly to the right side of the device. When affixed to a vehicle, '0' degrees may correspond to a view out of the right side window. Other horizontal directions may be indicated by increasing degrees from '0' to '360' moving counter-clockwise from '0.' In this example, a road FOV 302 may extend from '125' degrees to '55' degrees, which may correspond to a view of a portion of the road in front of a vehicle to which the device is affixed. The road FOV 302 in this example may correspond to an image sensor (or a camera) mounted behind the aperture 202 of the system 100 illustrated in FIGS. 2A and 2B. A right FOV 306 may extend from '75' degrees to '305' degrees, passing through '0' degrees. The right FOV 306 may correspond to an image sensor (or a camera) mounted behind the aperture 206 of the system 100 illustrated in FIGS. 2A and 2B. A cab FOV 304 may extend from '335' degrees to '205' degrees, which may correspond to a portion of the interior view of the vehicle. The cab FOV 304 may correspond to an image sensor (or a camera) mounted behind the aperture 204 of the system 100 illustrated in FIGS. 2A and 2B. A left FOV 308 may extend from '235' degrees to '105' degrees. The left FOV may correspond to an image sensor (or a camera) mounted behind the aperture 208 of the system 100 illustrated in FIGS. 2A and 2B.

As illustrated in FIG. 3A, an embodiment of certain aspects of the present disclosure may be configured so that every angle of a 360-degree circle 300 surrounding the system 100 may be covered by at least one camera. Such configuration may be considered to provide coverage for substantially the entire POV of a driver of a vehicle, which may include portions of the visual field that are visible when the driver re-orients his head to the left of right. In addition, some portions of the visual field may be covered by two cameras. For example, the portion 326 of the visual field between '75' degrees and '55' degrees in FIG. 3A may be covered by the road FOV 302 of the forward-facing camera and the right FOV 306 of the first side-facing camera.

While the example illustrated in FIG. 3A may provide coverage of a 360-degree horizontal view, other embodiments are contemplated in which the coverage may be less. For example, FIG. 3B illustrates an example in which a driver's vehicle 310 is equipped with three outward facing cameras: a left camera with a left FOV 364 extending to the left, a right camera with a right FOV 366 extending to the right, and a front camera with a front FOV 362 extending forward.

Privacy Concerns in an Intelligent Driver Monitoring System

As with stationary cameras, privacy concerns may arise for cameras that are affixed to moving vehicles. For example, a fleet manager may be responsible for the safety of a number of drivers, and may therefore deploy IDMS devices in each truck in his or her fleet. In some cases, an IDMS may be configured to only collect video data from the outside of the vehicle, as there may be privacy concerns associated with inward facing cameras. In some cases, however, the fleet manager may additionally wish to ensure that truck drivers are exhibiting safe behaviors, such as wearing seat belts, not texting while driving, and the like. To this end, an IDMS in accordance with certain aspects of the present disclosure may capture video that includes an inward facing camera. Inward-facing cameras may have other additional applications. For example, during or after a traffic accident, an inward facing camera may be used to show that the driver was alert to his or her surroundings, not talking on a cell phone, etc., the evidence of which may be helpful to the driver.

Figure 3B:
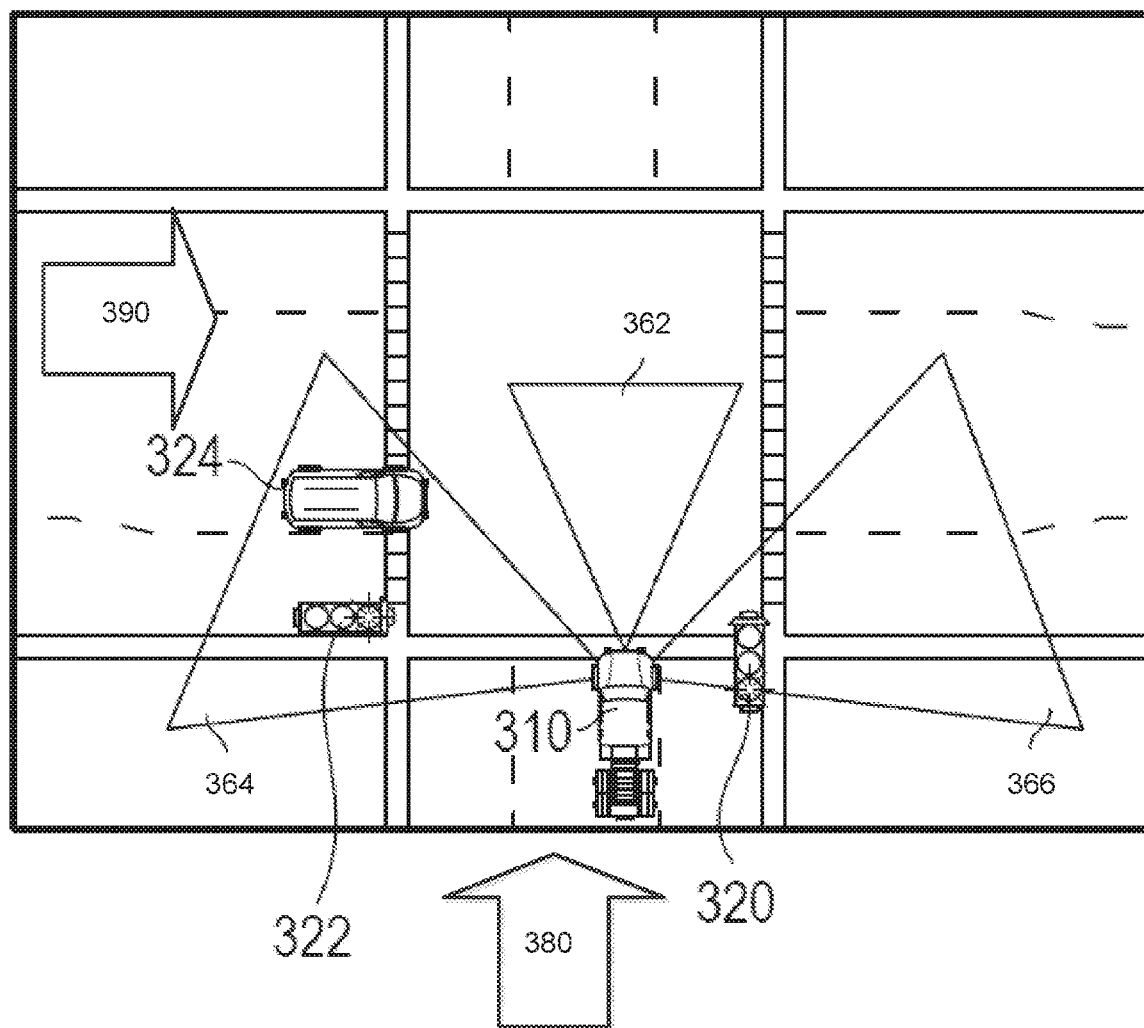
FIG. 3B illustrates an example of a visual field coverage of the system of FIG. 2A in accordance with certain aspects of the present disclosure.

FIG. 3B depicts a traffic situation that may lead to a collision, and illustrates certain benefits and privacy issues related to the use of cameras in an IDMS. In this example, a driver's vehicle 310 driving along a first street 380 stops at an intersection of the first street 380 and a second street 390. In this example, traffic light 320 for the first street 380 is provided on the right side of the first street 380 at the intersection. Hence, the traffic light 320 may be visible from the right camera FOV 316 but not from the front camera FOV 312. Assuming that the traffic light 320 turns to a green state indicating that the vehicle 310 may proceed through the intersection. In the meantime, a second vehicle 324 enters the intersection from the second street 390, where a second traffic light 322 for the second street 390 is in the red state indicating that the second vehicle 324 should not enter the intersection at that moment. In this example, a collision between the first vehicle 310 and the second vehicle 324 may occur at the intersection due to the second vehicle 324 running the red light. However, the front FOV 312 may not be wide enough to capture an image or a video of the second vehicle 324 running the red light. Thus, a video recording from the forward-facing camera alone may not be sufficient to establish that the second vehicle 324 is responsible for the collision. Additional cameras (e.g., side-facing cameras) of the system 100 disclosed herein may capture images or videos of additional FOV's 314, 316, to generate indisputable proof that the second vehicle 324 is indeed responsible for the collision.

In some embodiments, a fourth camera may be included in an IDMS device. In the example illustrated in FIG. 3B, for example, an IDMS in the driver's vehicle 310 may have a fourth camera having an inward-facing FOV. The fourth camera may capture a view of the driver.

Despite the potential benefits of video from an inward-facing camera, a driver may be uncomfortable with constant video monitoring, and may not want to have an IDMS with an inward-facing camera installed in his truck. In some cases, a truck driver may work together with a co-driver, where the co-driver may be sleeping or relaxing in the sleeper compartment. However, the co-driver in the sleeper compartment may be opposed to being monitored by the IDMS device. The driver or the co-driver may cover the backward-facing camera or disable the IDMS device.

Continuing with the example of the collision between the first vehicle 310 and the second vehicle 324 as described with respect to FIG. 3B, video from an inward-facing camera may be useful for determining the driver's alertness prior to the accident. An inward-facing camera may provide evidence, for example, that could indicate whether the driver of the first vehicle 310 was aware of the second vehicle 324 approaching from the left. An inward-facing camera may have recorded that the driver of the first vehicle 310 looked to the left at a time when the second vehicle 324 appeared to be coming to a stop. After the driver began to enter the intersection when the traffic light 320 is in a green state, the second vehicle may have not been able to stop in time or accelerated, thereby causing the accident. In this example, video data from these cameras could be used to establish the driver's attentiveness and the fault of the second driver. That is, a missing or disabled inward-facing camera could equate to a loss of evidence to prove the driver's attentiveness.

Despite the potential usefulness of video from an inward-facing camera in the aftermath of a collision, operators may choose to disable or remove an inward-facing camera due to privacy concerns (as described above) and/or liability concerns. Certain aspects of the present disclosure are directed to modifying a video according to a desired privacy so that a user may benefit from video data while still safeguarding sensitive information in video data. This may be achieved, for example, by modifying a portion of a field of view of a video, modifying a video for a time interval, or both.

If a truck driver is concerned about a camera pointed at a sleeping compartment, for example, the inward-facing camera may be disabled or otherwise obscured when someone is inside of the sleeping compartment in accordance with certain aspects of the present disclosure. For example, a portion of the inward-facing FOV that contains the sleeping compartment may be modified by scrambling the image in that region.

Alternatively, or in addition, a portion of the inward-facing FOV may be modified at all times that the truck is off-duty, when there is someone inside of the sleeping compartment, at certain hours of the day, and the like.

In accordance with certain aspects, privacy settings may include a way to configure over-rides, which may be referred to an exception triggers. For example, around the time of a collision, the system may automatically reverse or reduce certain privacy-based modifications that are otherwise applied.

Certain aspects of the present disclosure are directed to selecting and/or configuring privacy priorities. Continuing with the present example, the video associated with the interior cab may be modified by default to provide privacy to the driver. In the case of an accident, all or a portion of the privacy-based modifications may be reversed or lessened.

According to certain aspects, whenever sensitive information is present in a video stream the corresponding portion of the video may be obfuscated. An enabled IOT device may therefore give an operator confidence to deploy a camera in a location where it may be useful, knowing that the liability of collecting sensitive information may be mitigated. By modifying portions of a video that are associated with sensitive information, an IOT device may be enabled to capture more video than would be considered otherwise. For example, the IOT device may capture video from a 360 degree view at sometimes even if one or more cameras are disabled at other times.

Continuing with the present example, a driver may choose to install an enabled IDMS in his truck, because the driver may be confident that the IDMS will not record him while he is off-duty, that the IDMS will not record the driving partner when the driving partner is in the sleeping compartment, etc., but may still provide an advantageous proof, for example, in case of a driving accident.

Figure 4:
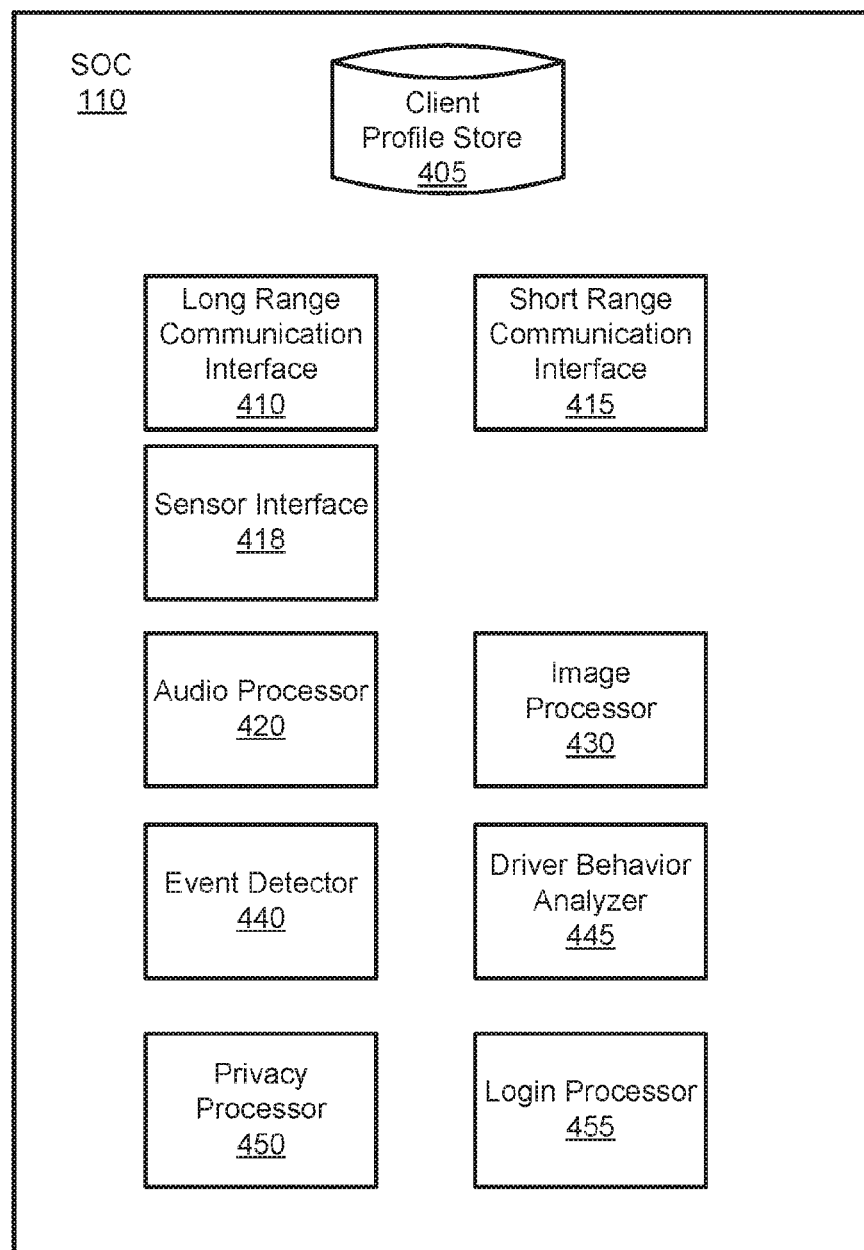
FIG. 4 illustrates a block diagram of a system on chip in FIG. 1 in accordance with certain aspects of the present disclosure.

Referring to FIG. 4, illustrated is an example block diagram of the SOC 110 of FIG. 1 in accordance with certain aspects of the present disclosure. In one embodiment, the SOC 110 includes a client profile store 405, a long range communication interface 410, a short range communication interface 415, a sensor interface 418, an audio processor 420, an image processor 430, an event detector 440, a driver behavior analyzer 445, a privacy processor 450, and a login processor 455. These components may operate together to capture images (or videos) inside the vehicle, and may automatically apply privacy screening to the captured images. These components may be embodied as hardware, software, firmware, or any combination of them. One or more components may be implemented by application specific integrated circuit (ASIC) or a reconfigurable field programmable gate array (FPGA). In some embodiments, one or more components of the SOC 110 may be implemented as a software module. In some embodiments, the SOC 110 includes fewer, more, or different components than shown in FIG. 4.

The client profile store 405 is a local store or a local database that stores client profiles. Examples of a client profile of a driver include a driver identification, associated IDMS identification, driver history, driver behavior, device attribute, and personal attribute. The driver identification identifies the driver, where the IDMS identification identifies an IDMS device associated with the driver. The driver history may include a total drive distance, total drive time length, a number of total drive accidents, etc. The driver behavior may indicate driving propensities of the driver. For example, the driver behavior indicates a number of unsafe driving actions (e.g., cell-phone usage, speeding, etc.) per driving distance or per driving time period. The device attribute indicates distinctive features of the beacon device 170, where the personal attribute indicates distinctive features of the driver (e.g., biometric signatures). The beacon device 170 may be an identification device worn or carried by a candidate driver that is authorized to drive an associated vehicle. The beacon device 170 may be an electronic device transmitting a unique short range wireless signal (e.g., Bluetooth, NFC, or RFID signal), a device showing a QR code, or a combination of them. Information stored by the client profile store 405 may be accessed by the components within the SOC 110, or transmitted to a remote server.

The long range communication interface 410 is a component that allows the SOC 110 to communicate with a remote server 150 through a network 160 (e.g., 1G, 2G, 3G, 4G, or higher bandwidth network). In one aspect, the long range communication interface 410 is coupled to the long range wireless communication device 116 of FIG. 1. The long range communication interface 410 receives remote client profiles from the remote server 150 through the network 160 to update the local client profile store 405. The long range communication interface 410 also transmits local client profiles to the remote server 150 through the network 160, in case any changes are made to the local client profiles. The long range communication interface 410 may exchange other information (e.g., sensor data, image data, video data, inferred data thereof, messages, or any combination of them) with the remote server 150 or other computing devices through the network 160.

The short range communication interface 415 is a component that allows the SOC 110 to communicate with other devices with a short range wireless communication (e.g., Bluetooth, NFC, RFID, etc.). The short range communication interface 415 may communicate with nearby sensor devices in a vehicle to obtain sensor data. In addition, the short range communication interface 415 may communicate with a beacon device 170 to receive a wireless signal from the beacon device 170 and obtain device attribute of the beacon device 170 based on the received wireless signal, as described in detail below with respect to FIGS. 11 through 13.

The sensor interface 418 is a component that interfaces with sensor devices of the SOC 110. For example, the sensor interface 418 communicates with the GPS device 112 or the inertial sensors 106 to receive sensor data indicating sensor measurements (e.g., GPS measurement, inertial sensor measurement, etc.) Sensor data may be used to detect a certain event (e.g., possible accident, hard-stop, sudden acceleration, etc.).

The audio processor 420 is a component that detects a driver's voice. The audio processor 420 is electrically connected to a microphone coupled to the system 100, and receives audio data indicating a voice input or a voice command from the microphone. In one aspect, the audio processor 420 receives the audio data, and detects a driver's verbal command based on the audio data to perform actions requested by the driver. The audio processor 420 may implement a machine learning neural network to determine the verbal command based on the audio data. The audio processor 420 may store the audio data at the memory 114 of FIG. 1.

The image processor 430 is a component that detects a driver or other passengers from the cab FOV 304. The image processor 430 is electrically connected to cameras coupled to the system 100, and receives image data indicating captured image or video data indicating captured videos from the cameras. In one aspect, the image processor 430 receives the image data or video data, and performs image processing to obtain motion vectors or extract particular features of objects in the cab FOV 304. For example, the image processor 430 extracts outlines of face, nose, mouth, eyes, or a combination of them, and obtains motion vectors of the extracted features or other part of the driver in the cab FOV 304. Hence, the image processor 430 may operate as a face detector. The image processor 430 may store the image data, video data, modified data including extracted features or motion vectors, or any combination of them at the memory 114 shown in FIG. 1.

The event detector 440 is a component that determines whether a particular event occurred, and executes a corresponding process. The event detector 440 may be communicatively coupled to the sensor interface 418, the audio processor 420, and the image processor 430, and analyzes outputs from these components to determine whether a certain event occurred. For example, the event detector 440 detects a possible collision or an abrupt driving behavior based on the sensor data from the sensor interface 418. For another example, the event detector 440 determines that the driver provided a verbal command to start recording a video, and the event detector 440 causes the cameras to start recording. For another example, the event detector 440 detects a presence of a passenger in a predetermined region of a FOV, based on the image data or the video data. For another example, the event detector 440 detects a presence of a passenger in the vehicle based on extracted features or motion vectors from the image processor 430. For another example, the event detector 440 detects a QR code in the FOV based on the image data or the video data, and decodes the QR code. For another example, the event detector 440 detects the vehicle moving over a predetermined speed or over a predetermined distance based on the sensor data. Additional examples of events detected by the event detector 440 are described below with respect to FIGS. 5 through 10.

The driver behavior analyzer 445 is a component that determines a driving behavior of the driver and generates inferred data indicating the determined driving behavior. In one aspect, the driver behavior analyzer 445 determines a driving behavior of the driver in consideration of outside circumstances of the vehicle as described herein. For example, the driver behavior analyzer 445 determines the driver's motion or reaction in response to nearby traffic condition. For another example, the driver behavior analyzer 445 determines a user state of drowsiness, distracted driving, cell phone usage, attentiveness, or a combination of them based on the extracted features or motion vectors from the image processor 430.

The privacy processor 450 is a component that applies privacy screening to the image data or the video data. The privacy processor 450 may receive image data or video data, and modifies the received data to hide a portion of the FOV in the image data or the video data. In one approach, the privacy processor 450 adaptively detects a presence of a passenger, and automatically applies privacy screening to a region of the FOV corresponding to the presence of the passenger. In another approach, the privacy processor 450 applies privacy screening to a predetermined region of the FOV. The privacy processor 450 may apply privacy screening to blur, disable, or convert into a "stick-figure" a portion of the FOV in the image data. Detailed examples and processes of performing privacy screening are provided below with respect to FIGS. 5 through 10.

The login processor 455 is a component that verifies whether the driver is an authorized driver of the vehicle. In one embodiment, the login processor 455 verifies the driver based on a device attribute of the beacon device 170, and a personal attribute of the driver. Verifying the driver of the vehicle through the device attribute and the personal attribute allows accuracy and efficiency of confirming identity of the driver to be improved. Additional details and examples of verifying the driver based on the device attribute and the personal attribute are provided below with respect to FIGS. 10 through 13.

In one aspect, "authorized driver" herein may be "a known driver." In some embodiments, the SOC 110 may not include a database of which driver is supposed to be driving which vehicle. Instead, the SOC 110 may be configured to identify which driver is currently driving the vehicle. In this case, any driver may be authorized to drive any vehicle in the fleet. The goal of the SOC 110 is to properly assign driving behavior metrics to the correct driver. Also, at the same time, "a known driver" may not be "a recognized driver," but correspond to "a verified driver." That is, the SOC 110 may or may not recognize who the driver is, but rather, may simply determine that the current driver is the same person that was verified at an earlier time.

Manually Disabling or Enabling a Video Stream

As with the examples described in FIG. 3A and FIG. 3B, a video capturing system or device, such as an IDMS, may include multiple video streams. A device such as the one illustrated in FIG. 2A and FIG. 2B, for example, may capture four video streams. When mounted in the interior of a vehicle, the FOVs of the four video streams may cover a 360-degree horizontal view around the device, as illustrated in FIG. 3A. The combination of video streams may be considered as a video with a 360-degree FOV in the horizontal direction. In some embodiments, a device such as the one illustrated in FIG. 2A and FIG. 2B may capture more than four video streams, for example, by wirelessly connecting to remotely mounted cameras.

The disclosed system 100 is capable of collecting multiple video streams to enable or disable one or more of the video streams for a period of time. As described above with respect to FIG. 3B, an inward-facing camera may be disabled when the driver is off-duty.

In one example, the system 100 includes a first button that, when pressed, disables the inward facing camera. In addition, the system 100 may include a second button that, when pressed, enables the inward facing camera. In this example, an IOT device that is intended to monitor driving behavior may be enabled when a driver is driving, but may be disabled when a driver is off-duty.

An enabled device may include an indication of the current privacy state, which may equate in the present example to an indication of whether the inward-facing camera is on or off. For example, an LED light may illuminate when the camera is on (e.g. privacy 'off'), and the LED light may extinguish when the camera is off (e.g. privacy 'on').

As the presence of an LED light may be an irritant to a driver, especially during night-time driving, additional ways of indicating the privacy state are also contemplated. For example, the LED indicator may illuminate when the camera is off (e.g. privacy 'on'), and may extinguish when the camera is on (e.g. privacy 'off').

In some embodiments, a fleet may configure an IDMS so that an LED indicator may turn on to indicate that the privacy mode is not in its default state. In one example, a truck fleet may configure IDMS devices such that the inward-facing camera is off by default. In this case, the LED might illuminate if an over-ride condition is detected (as described in more detail below) such that the inward-facing camera is temporarily turned on. Alternatively, a truck fleet may configure devices such that the inward-facing camera is on by default. In this case, the LED might illuminate to indicate that the inward-facing camera is off (e.g. privacy 'on').

For a system with a combined 360-degree FOV, disabling an inward-facing camera may be considered a way of enabling privacy for all portions of the combined view that are only covered by the inward-facing camera. In the example shown in FIG. 3A, this portion of the video may correspond to the portion of the combined FOV extending from '235' degrees to '305' degrees in the horizontal direction. While the inward facing camera FOV 304 in this example may extend from '205' degrees to '335' degrees, the portion 348 of the FOV from '205' degrees to '235' degrees may be captured by the left camera in this example. Similarly, the portion 318 of the FOV from '305' degrees to '335' degrees may be covered by the right camera.

In the above example, a button on the device may function as a toggle to turn the desired privacy setting 'on' or 'off.' A first button press may disable a video stream, for example, and thus enable privacy for a portion of the combined video that may be recorded by the device. A second button press may return the system back to the previous setting. As the driver may be unsure about the state of the device, the button may physically toggle between two positions, such as an extended position and a depressed position, which may indicate that the inward facing camera is enabled or disabled, respectively.

In addition to a button press, several other methods of enabling or disabling a portion of a video are contemplated. For example, a privacy mode may be turned 'on' in response to a voice command. In another example, a privacy mode may be turned 'on' in response to a presentation of a QR code, or other image. In some embodiments, a second electronic device, such as a touch-enabled smartphone, may be used such that a driver or passenger may press a button or screen icon on the electronic device to enable or disable a privacy mode. Alternatively, or additionally, a remote operator, such as a safety manager for a trucking fleet, may interact with an internet portal to instruct an installed device to enable or disable a privacy mode.

Automatically Disabling and Enabling a Video Stream

According to certain aspects of the present disclosure, an IOT device in accordance with certain aspects of the present disclosure may enable or disable a privacy mode based on the detection of an event rather than a manual input. In some embodiments, a video stream may be enabled or disabled in response to the detection of a triggering event. In one example, a device may be equipped with a means for establishing a physical location, such as a GPS module or through a camera and database system capable of recognizing a location based on visual data. In this example, the entry into a geo-fenced location may enable or disable a privacy mode. For example, a military base may establish a geo-fence such that devices with cameras may, in accordance with certain aspects of the present disclosure, disable outward facing cameras when on a military base.

In another example, an enabled device may communicate with a ride-sharing application to trigger a privacy mode based on events relating to picking up and dropping off passengers. In one example, a privacy mode may be enabled based on whether a driver has picked up a passenger. Alternatively, or in addition, a privacy mode may be enabled in response to a driver accepting a request for taxi service, when a vehicle door opens, when a passenger enters a vehicle, when a weight sensor on a passenger seat indicates a sudden change, and the like. In some embodiments a privacy mode trigger may be based at least in part on a desired privacy setting of a particular passenger. Likewise, a privacy mode may be disabled when a passenger exits a vehicle, when a driver logs out of a ride-sharing app, and the like. Furthermore, a device may enable or disable different privacy modes based on different detected events, as described below.

For some users of the aforementioned systems, devices, and methods for modifying a video according to a desired privacy, a privacy mode may be enabled when a passenger enters into a designated space of a vehicle, such as the driver's area. For example, an operator may configure a device to obscure the identity of passengers by default, but to override the privacy mode if the passenger is argumentative, threatening, or if a situation corresponding to danger to the driver is recognized.

In some embodiments, a driving event may be used as a trigger to enable or disable a privacy mode. For example, if a hard-stop is detected, a privacy mode may be disabled. In one example, a device may be configured to record and obfuscate all inward-facing camera data by default. The device may be further configured to override this setting based on a detected hard-stop. For example, the device may request an encryption key from a remote server 150 that may be used to reverse encryption on a portion of video surrounding the event. Alternatively, the video may be temporarily stored to a queue by default. The detection of a hard-braking event may tag a portion of the temporarily stored video, which may include video recorded after the event, to be stored without encryption, or to be stored such that certain portions and/or time intervals of the video are stored without encryption.

A privacy mode may be disabled in response to a traffic violation that may not be associated with a detectable change on an inertial sensor. For example, a driver may drive through a red light without a substantial acceleration or deceleration. Upon detecting a red light violation, a device may store and/or transmit corresponding video data according to a different privacy setting than it would at other times.

One or more events that may be detected in video data may be used to trigger a change in a privacy mode. Several devices, systems, and methods of detecting an event in video data are described in PCT Patent Application No. PCT/US17/13062—"Driver Behavior Monitoring," filed Jan. 11, 2017, which is incorporated herein by reference in its entirety.

Several manual and autonomous methods of triggering an application of a privacy setting are contemplated, including the triggers listed above. For some applications, a privacy mode 'on' or 'off' may be configured automatically. Considering the examples of manual triggers (in which privacy may be enabled by a button press, a voice command, the presentation of a QR code and the like), a human operator may forget to press the button, issue the voice command, present the QR code, etc., at the end of a day of driving. If so, he may leave the inward facing camera running even when he is off-duty. Similarly, he may remember to enable privacy when off-duty, but may forget to disable privacy when on-duty. In one aspect, enabling and/or disabling privacy may be configured automatically without a manual trigger or input from a person.

Instead of a human-provided trigger, a system may automatically determine that a desired privacy should be applied. In one example, a system may enable privacy when a vehicle is in an Engine Off or Engine Idling state. In this example, Engine Idling may refer to a situation in which the vehicle is stationary for at least N minutes, where N may be 3. In some embodiments, the value of N may be chosen by a user. Privacy may be disabled in this example when the vehicle speed crosses a certain threshold. For example, privacy may be disabled when the vehicle speed crosses 15 mph.

In some embodiments, a human operator may configure a privacy mode and a triggering event that may be associated with the privacy mode. In the present example, a privacy mode may correspond to the inward-facing camera being disabled. According to certain aspects, the occurrence of the specified triggering event may be detected (or otherwise determined to have occurred) at which time the privacy mode may be applied to the portion of video data captured around the time of the event. In this example, the portion of the video data may be the portion corresponding to the FOV that is only covered by the inward facing camera. Thus enabled, a system or device may enable or disable a specified privacy mode at appropriate times based on a triggering event, wherein the triggering event without an explicit trigger from a human.

Continuing with the example of a truck driver that may desire privacy when off-duty, a four-camera system may effectively become a three-camera system when a driver is off-duty according to certain aspects of the present disclosure. This may be a preferable way of monitoring a driver and the surrounding visual field in comparison to an alternative that does not utilize active privacy. For example, a first driver may decide to install an IDMS that does not have an inward facing camera so that there could be no concern that an inward facing camera would ever be mistakenly left activated. In another example, a second driver may decide to install a four camera system, but to shut down the inward-facing camera when he is off-duty using Active Privacy. This configuration may be preferable to one in which the entire IDMS is shut down when the driver is off-duty, since the remaining cameras (left, front, and right) may still monitor and/or record the area surrounding a vehicle, thus providing security to the vehicle.

For some applications, a portion of a combined FOV for which privacy should be applied may be designated to extend beyond the FOV of a single camera, but not to extend to include the entire FOV of a second camera. Continuing with the example of a truck driver, video data may be modified from the entirety of an inward-facing camera FOV and half of a left-facing camera FOV. This configuration may ensure that an image of the driver is not captured when the privacy mode is enabled, but may still monitor a portion of the FOV that is covered by the left-facing camera. Several methods of achieving this desired privacy mode are contemplated. For example, when this privacy mode is 'on,' the inward-facing camera may be disabled and the left-facing camera may be processed such that pixel values associated with the left portion of its FOV are set to 'black.' A privacy mode of 'black' may refer to setting pixel values to (0,0,0) in the case of a three-channel color sensor or (0) in the case of a one-channel grayscale sensor. Alternatively, pixel values may be ignored or not written to memory. Several techniques for modifying a portion of an image are contemplated, as described in the next section.

A Portion of an Image

For an inward-facing camera in a vehicle, different portions of the FOV might capture different objects or different types of information. In some applications, a portion of the FOV may be obfuscated. For example, the driver or other passengers of a vehicle may be obscured, but portions of within the vehicle may be monitored to gather other relevant information from an inward-facing camera, but still maintain the privacy of the driver or one or more passengers in the vehicle.

Figure 5A:
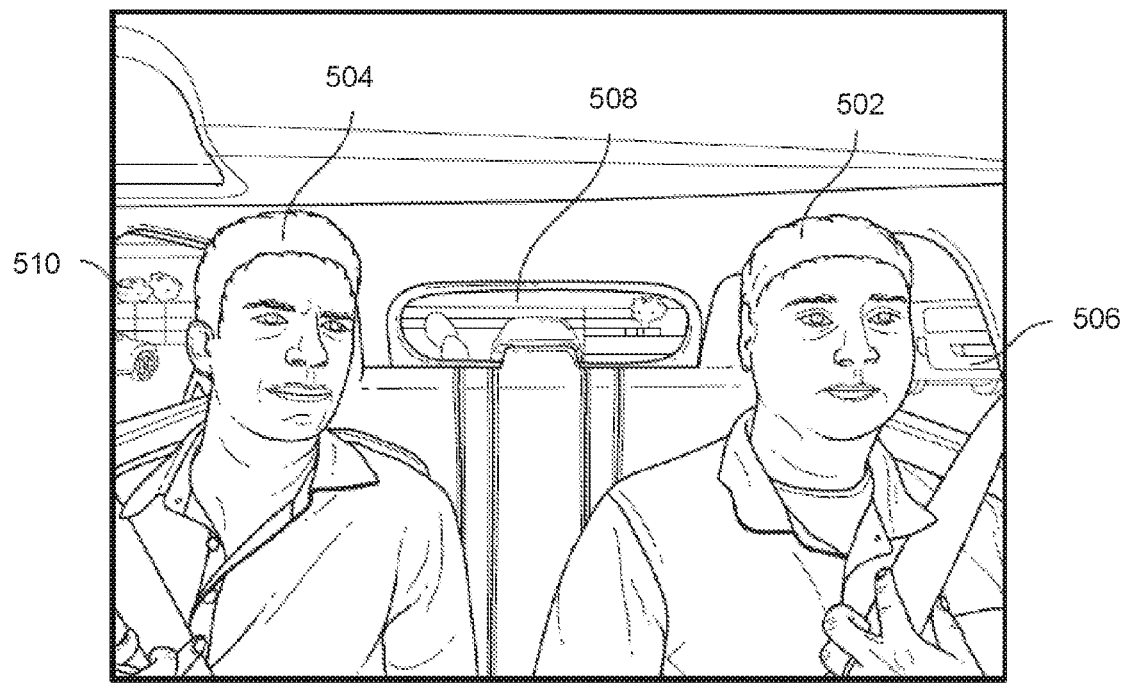
FIG. 5A illustrates an example of an image captured by an inward-facing camera in accordance with certain aspects of the present disclosure.
Figure 5B:
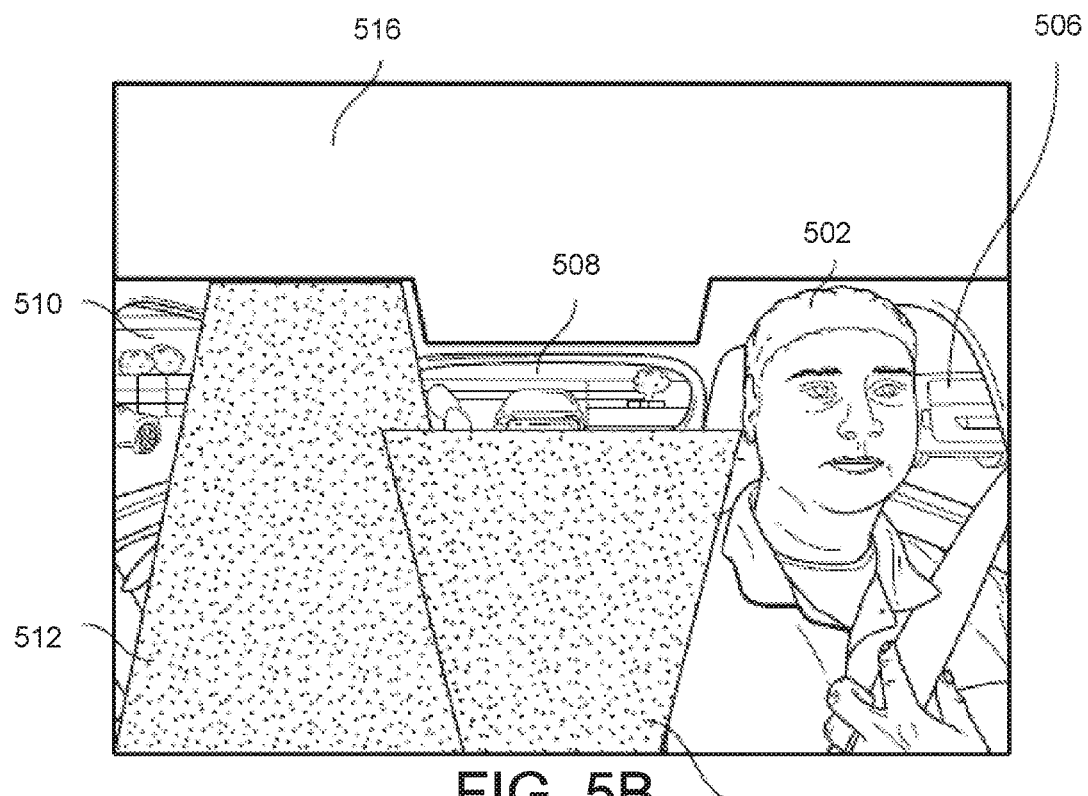
FIG. 5B illustrates an example of an image that has been modified in accordance with certain aspects of the present disclosure.
Figure 5C:
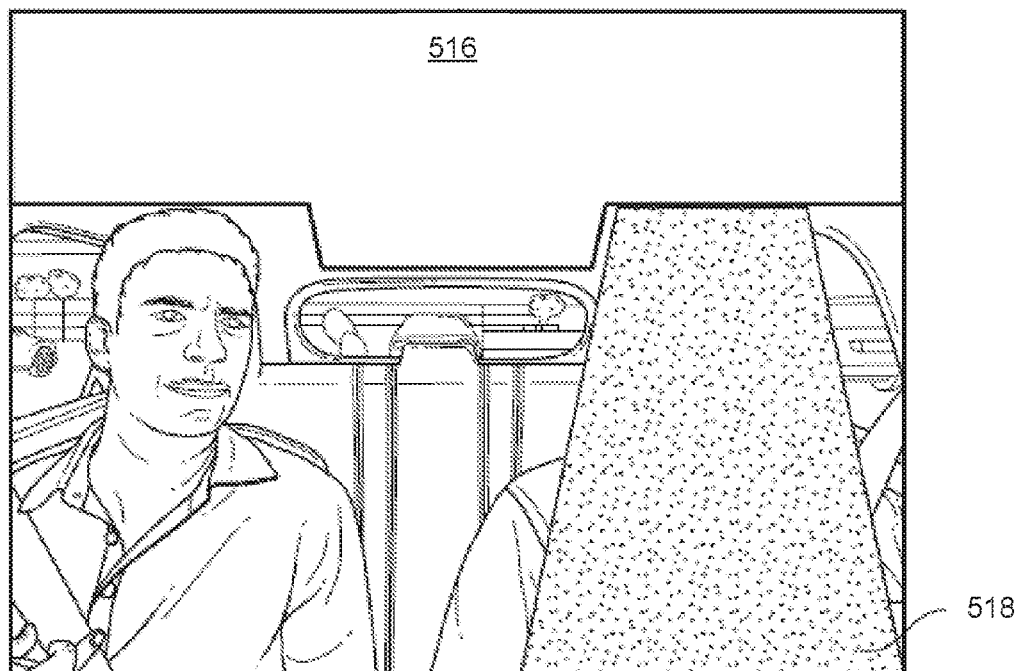
FIG. 5C illustrates an example of another image that has been modified in accordance with certain aspects of the present disclosure.
Figure 5D:
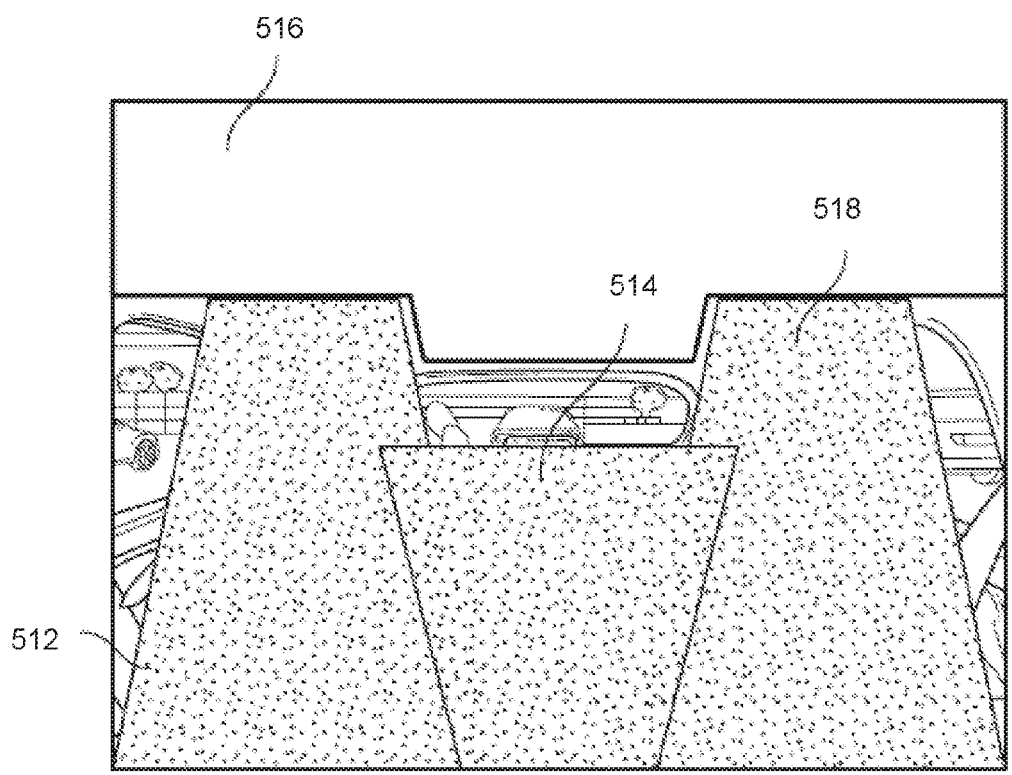
FIG. 5D illustrates an example of another image that has been modified in accordance with certain aspects of the present disclosure.

An exemplary image from an inward-facing camera is shown in FIG. 5A. In this figure, the driver 502 is on the left side of a car. The left side of a car may appear in the right side of the inward-facing camera FOV when the camera is mounted on a rear-view mirror or on the windshield, as in this example. In some vehicles, such as in delivery vehicles in the United States, a driver may be more typically found on the left side from this perspective. Similarly, in some countries, such as India, drivers may be typically found on the left side from this perspective, which may correspond to the right side of the car. In this image, the driver 502 is accompanied by a passenger 504 in the passenger seat, and there are no passengers in the back seat. There are three windows visible in this view, the driver side back seat window region 506, the rear window region 508, and the passenger side back seat window region 510. FIGS. 5B through D illustrate how different portions of an image may be modified according to different privacy settings, as described below.

FIG. 5B illustrates an example of the aforementioned method for modifying a video according to a desired privacy, in which a desired privacy is selected for each of multiple regions in the image. In this example, the desired privacy for the driver 502 may be set to "none" (meaning that the system may leave the portion of the FOV associated with the driver unmodified), so that the driver 502 of the vehicle may be monitored by anyone having access to the video. The desired privacy of any visible windows may be set to "none" as well, so that views of the road through any of the visible windows (such as the driver side back seat window region 506, the rear window region 508, and the passenger side back seat window region 510) may be left unmodified. Furthermore, the desired privacy of passenger areas (such as the passenger seat region 512 or the back seat region 514 may be set to "scrambled." In this example, the video associated with the passenger may not be interpretable by someone watching the video output. The scrambled modification may help to maintain the privacy of any passengers. In some embodiments, a scrambled signal may be restored at a later time by an authorized person, as described below.

This privacy configuration illustrated in FIG. 5B may be advantageous for Team Drivers who may take turns driving a vehicle. When one of the drivers is off-duty, such as the passenger 504 in FIG. 5A, the portion of the video corresponding to locations where he may be seated may be modified to enhance the privacy of that person. In this case, a passenger seat region 512 and a back seat region 514 may be obscured.

In addition to addressing privacy concerns, certain aspects of the present disclosure may be applied to conserve compute or memory storage resources. In the example illustrated in FIG. 5B, the operator may have determined that it is highly unlikely that something of interest will occur in a portion of the FOV corresponding to the interior roof of the automobile. In the interest of saving compute and/or memory resources (associated with processing and/or storing captured pixel data in this portion, respectively), the operator may choose to ignore visual information from certain identified regions. In this case, the desired privacy of the roof region 516 may be set to "black," indicating that there is neither a desire to obscure nor to view the visual information in that region. Pixels from the roof region 516 may be ignored or may be reset to a uniform color. Still, an illustration of the entire FOV may draw this region in a uniform color, such as in black, as shown in FIG. 5B.

According to certain aspects of the present disclosure, an enabled system may be configured to ignore visual information from a selected portion of a FOV (which may be a region of an image from one camera) without input from a human operator. In this example, the system may be configured to detect relevant objects for a user-defined task. After a time, the system may determine that objects of interest do not appear in a certain portion of the FOV, or that objects of interest appear in that region with a frequency that is below a threshold. The system may then set the portion to a "black" mode.

Unlike the scrambled portions of the image (such as 512 and 514 of FIG. 5B), the blacked-out portions of the image (such as 516 of FIG. 5B) may not be recoverable at a later time. Because the visual information has been ignored or discarded, a "black" portion of the FOV may be stored in memory with fewer bits per unit of image area. In addition, computations performed on the image may skip these regions, effectively reducing the input image dimensions.

While the present example illustrates an ignored region as "black" and an obfuscated region as "scrambled," other ways of illustrating video content within a given portion of the image are also contemplated. For example, an ignored region may be illustrated as a region with a noisy textured pattern so that it has an appearance that is similar to the scrambled portions of FIG. 5B. Likewise, an obfuscated but recoverable region, such as 512 or 514 in FIG. 5B may be illustrated with a uniform black color in a video viewer.

In some applications, the passengers of a vehicle may be monitored, while maintaining the privacy of the driver. For example, an IDMS that is enabled according to certain aspects of the present disclosure may have a privacy configuration wherein the portions of an inward-facing video FOV where the driver might sit or rest (either on-duty or off) may be obscured by default. A fleet management company that is responsible for the vehicle and/or the cargo may have a policy against having passengers riding in the vehicle with the driver. In this situation, the portion of the FOV associated with the driver may be obscured, but the portions of the FOV corresponding to passenger areas may remain unmodified.

FIG. 5C illustrates an example of the aforementioned method for modifying a video according to a desired privacy, in which a desired privacy mode is selected for each of multiple portions of an image in a video. The desired privacy mode for the driver seat region 518 may be set to "scrambled." The desired privacy of passenger areas (such as the passenger seat region or the back seat region may be set to "none." As in FIG. 5B, the interior roof region 516 may be set to "black."

FIG. 5D illustrates an example of the aforementioned method for modifying a video according to a desired privacy, in which the desired privacy for the driver and the desired privacy of passenger areas (such as the passenger seat region 512 or the back seat region 514) may be set to "scrambled." As in FIGS. 5B and 5C, the interior roof region 516 may be set to "black." A device may be configured with these privacy settings if the user is primarily interested in having video data corresponding to the outside of the vehicle. Such video data may be useful, for example, in monitoring a blind-spot of a driver.

Triggering a Privacy Mode for a Portion of an Image

In some embodiments, a triggering event may be associated with a desired privacy and a selected portion of a video image. Continuing with the example described with respect to FIG. 5C, in which a fleet management company maintains a no-passenger policy, a triggering event may be the appearance of a passenger in either the passenger seat or in a back seat. According to certain aspects of the present disclosure, a desired privacy for the driver seat region 518, passenger seat region 512, and back seat region 514 regions may be set to "scrambled" by default, as illustrated in FIG. 5D. In addition, the appearance of a passenger may be selected as a triggering event. This triggering event may have an associated desired privacy mode and a portion of a video that is different from the default. In this example, the triggering event may be associated with a "none" privacy mode for the passenger seat region 512 and back seat region 514 portions of the video. Since privacy is removed in this example, this triggering event may be considered an exception trigger. When a system has determined that a passenger has appeared (the "trigger"), the privacy mode settings associated with this triggering event ("none") may override the default settings. In this example, based on the system 100 (e.g., event detector 440) determining that a passenger is seated in the passenger seat, the scrambling applied to the passenger and back seat regions (collectively the "portion") may be removed, resulting in the view as shown in FIG. 5C.

Several methods for determining whether a triggering event has occurred are contemplated. In the present example, video from an inward facing camera may be used to detect, for example, faces in the FOV. If more than one face is detected, the system 100 may determine that a passenger has appeared in the vehicle. Similarly, the system 100 may detect a single face, but may compare the detected face with a different image of the driver or with a representation of previously observed features of the driver's face, etc., and may determine that there is not a match. In either case, the detection of a passenger in the vehicle may trigger the application of the associated privacy setting to the indicated portion of the image. The privacy setting may be applied for a period around the detected event, including before the event by, for example, descrambling the appropriate portion of video that may be stored locally on the device.

In some embodiment, the occurrence of a triggering event may be detected without reliance on video data. For example, the determination of a triggering event may be made based on the outputs of other sensors. In one example, a system may access a weight sensor in the passenger seat, either directly via a wired connection, via Bluetooth, or via the vehicle's OBD-II port. The determination of the triggering event may be based on the output of such a weight sensor alone, and/or in conjunction with another sensor. For example, an ultrasound sensor may be used to determine the presence of an object in the passenger seat with a signature that matches that of a human passenger (rather than, for example, a heavy cardboard box). This output, either alone, or in combination with output from a weight sensor, may be used to determine the presence of a passenger.

Zone-Based Vs. Object-Based Privacy

In accordance with certain aspects of the present disclosure, a portion of a video may be selected as a zone (or a region), as an object, or as a combination including a zone and an object. In the example illustrated in FIG. 5D, three regions (512, 514, and 518) may have been selected to have a desired privacy of "scrambled." In that example, a driver seat region 518 may have been selected according to where a driver is likely to appear in the FOV. For example, after installation of an inward-facing camera, an enabled system may identify portions of the FOV corresponding to a driver, a passenger, etc. In this example, the driver seat region 518 may be a trapezoidal region covering the driver. In some embodiments, the location of a driver zone (or a driver seat region) may be updated or refined according to a history of observed driver locations.

Figure 6A:
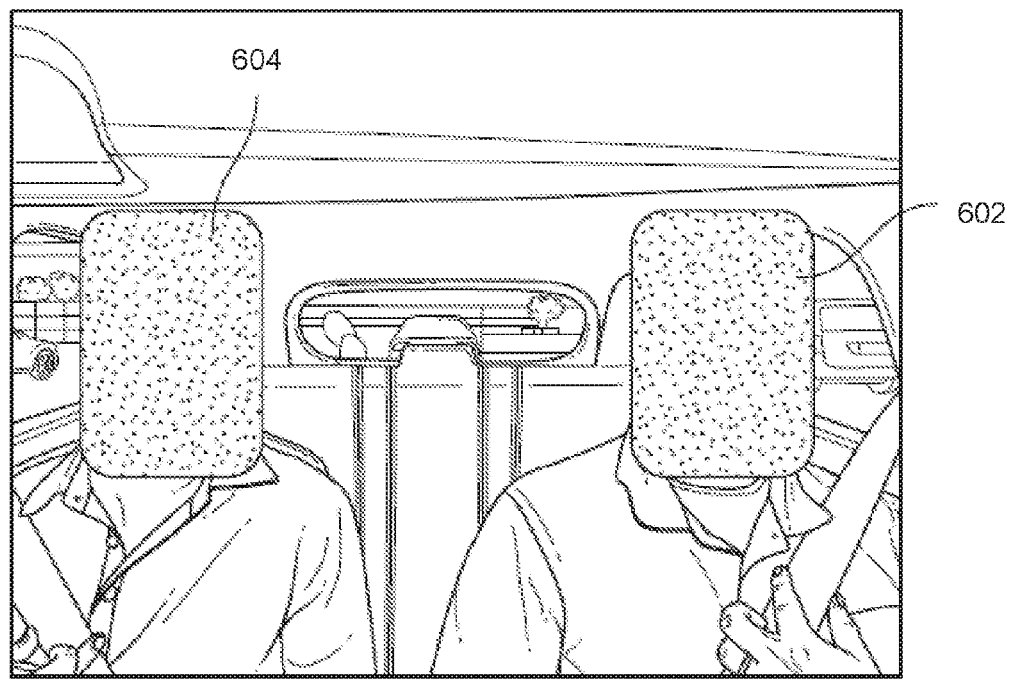
FIG. 6A illustrates an example of an image that has been modified in accordance with certain aspects of the present disclosure.

In some implementation, privacy-based modifications of a video may follow the movements of an object. In a vehicle, a moving object may be a driver's face, arms, torso, and the like. In a fixed video surveillance system, a moving object may be a child walking past a camera on her way to school. FIG. 6A illustrates an output image from an embodiment of the present disclosure in which two objects were selected for privacy modification, the face of the driver and the face of the passenger. In this example, the desired privacy of portions 602, 604 of the image corresponding to the selected objects may have been set to "scrambled," as illustrated in FIG. 6A. Over the course of a video sequence, the location of the driver's face and/or the passenger's face may move within the FOV of the inward-facing camera. If the modified portion of the video were stationary within the FOV of the inward-facing camera, a large movement by the passenger, for example, might bring all or a portion of his face outside of the modified zone, and thus degrade or destroy the desired privacy.

According to certain aspects of the present disclosure, modifying a selected portion of a video according to a desired privacy may include a step of determining the location of a selected object. In this example, a face detection algorithm may be used (alone, or in combination with a tracking algorithm) to determine the location of the object in a given frame of the video. After determining the location of the object, an enabled system may select a portion of the video based on the determined location of the object. The determined location of the object and the selected portion of the video need not be the same. For example, the selected portion may be centered at the same location as the determined location of the object, but may be 25% larger.

Figure 6B:
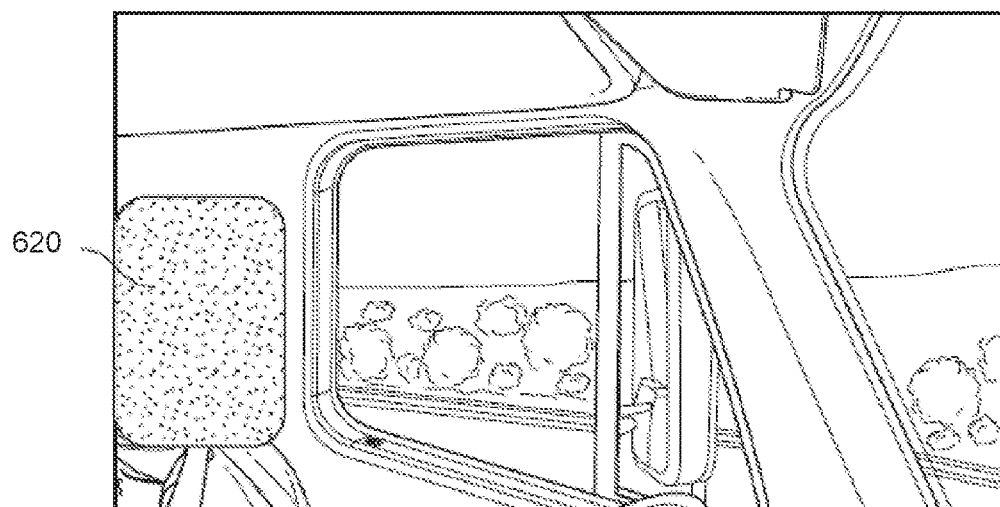
FIG. 6B illustrates an example of another image that has been modified in accordance with certain aspects of the present disclosure.

FIG. 6B illustrates a view of a left-facing camera that, like FIG. 6A, captures a view of the face of a driver. In this example, the portion 620 of the left FOV corresponding to the driver's face is scrambled.

Figure 6C:
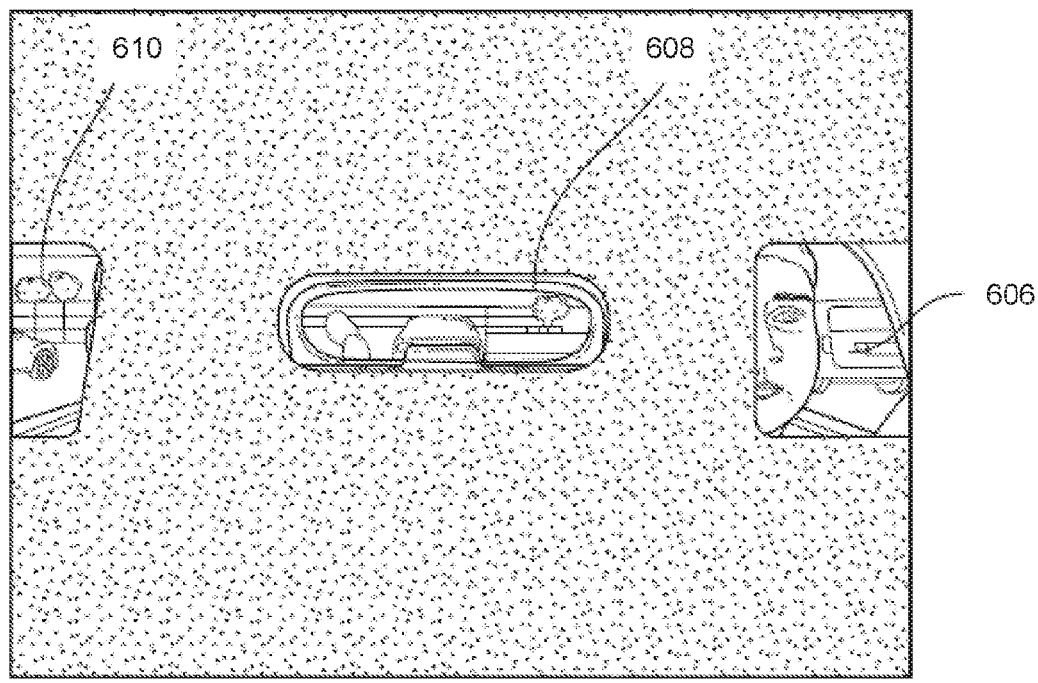
FIG. 6C illustrates an example of another image that has been modified in accordance with certain aspects of the present disclosure.
Figure 6D:
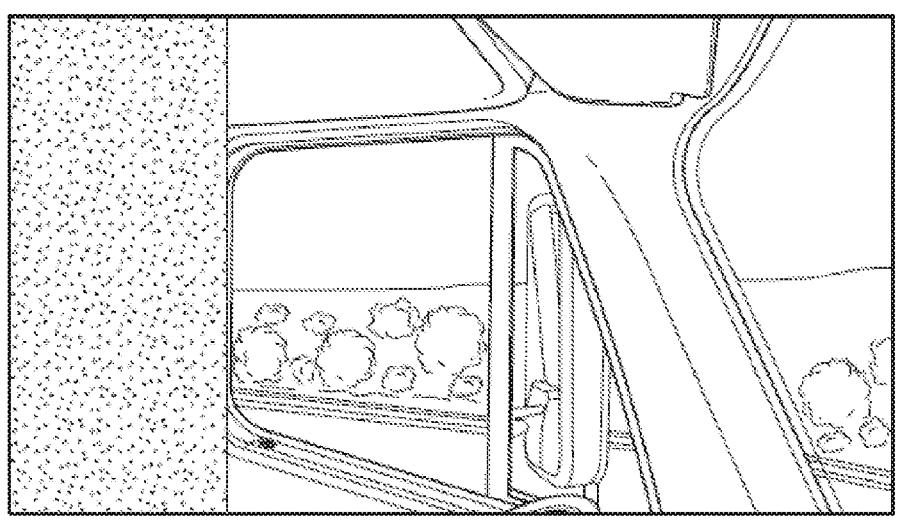
FIG. 6D illustrates an example of another image that has been modified in accordance with certain aspects of the present disclosure.
Figure 6E:
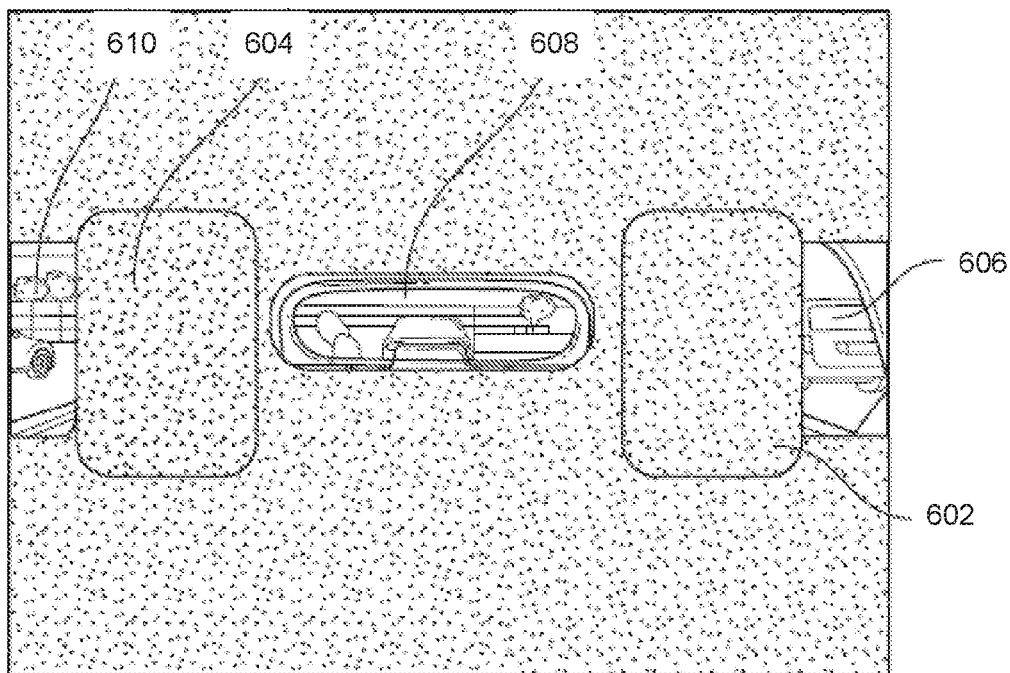
FIG. 6E illustrates an example of another image that has been modified in accordance with certain aspects of the present disclosure.
Figure 6F:
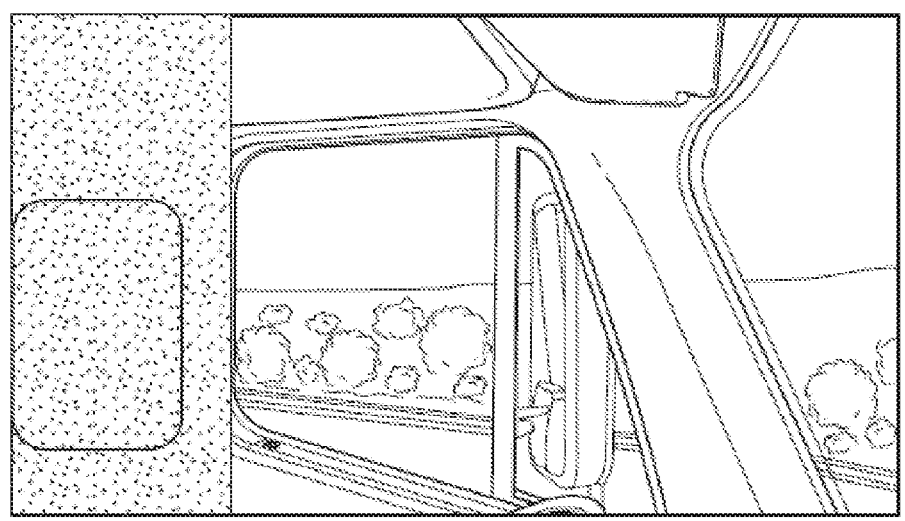
FIG. 6F illustrates an example of another image that has been modified in accordance with certain aspects of the present disclosure.

FIG. 6C and FIG. 6D illustrate the same view as FIG. 6A and FIG. 6B, but the privacy setting is configured such that window portions 606, 608, 610 corresponding to rear driver window, rear window, and rear passenger window, respectively have a privacy setting of "none" and the remaining zones have a privacy setting of "scrambled." This example may illustrate the utility of a system that may specify privacy modes in an object-based fashion. As can be seen in FIG. 6C, a driver's face may sometimes cross in front of a view of a window. In this example, the driver's face has crossed in front of the rear driver window portion 606. According to the privacy configuration illustrated in FIG. 6C, a portion of the driver's face may be unscrambled at these times. As this may be undesired, the driver may instead configure privacy settings as a combination of what is shown in FIG. 6A and FIG. 6C. For example, the driver may configure a desired privacy mode as "none" for the window locations, but these may be overridden by a desired privacy mode of "scrambled" for the driver and passenger faces. Accordingly, as shown in FIG. 6E and FIG. 6F, the window portions 606, 608, 610 that are not blocked by the portions 602, 604 corresponding to faces of the passenger and the driver may be left unscrambled.

Figure 7A:
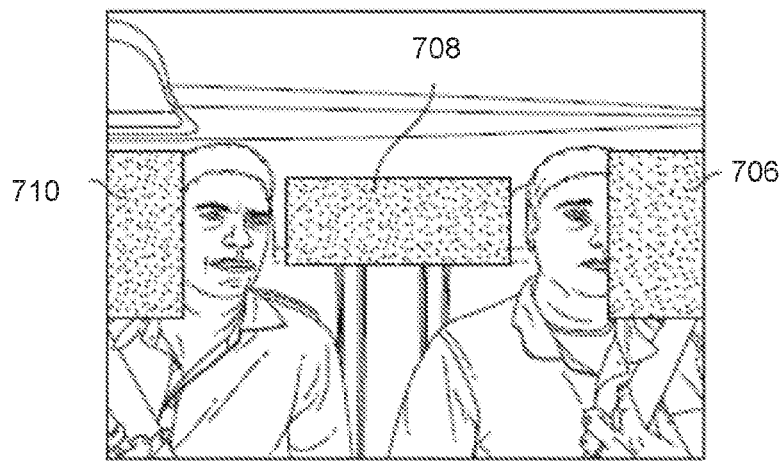
FIG. 7A illustrates an example of an image that has been modified in accordance with certain aspects of the present disclosure.
Figure 7B:
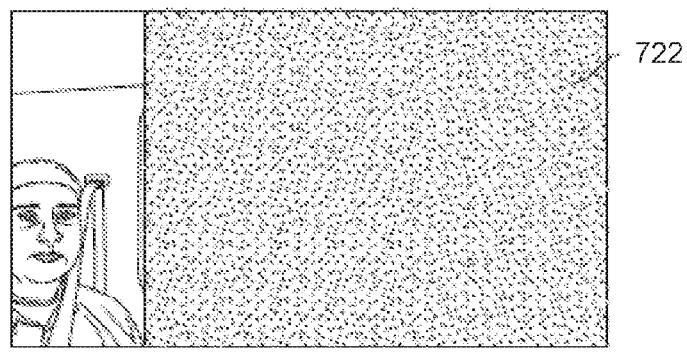
FIG. 7B illustrates another example of an image that has been modified in accordance with certain aspects of the present disclosure.

While the previous examples illustrate a modification of portions of video corresponding to people and locations inside a vehicle, other privacy settings are contemplated. For example, the system 100 may obfuscate portions of a video stream that are directed to the outside of a vehicle. This configuration may be applied near a military base, airport, or other secure area. In FIG. 7A, the image from an inward facing camera is shown in which the portions 706, 708, 710 of the FOV corresponding to rear driver window, rear window, and rear passenger window, respectively are obfuscated. Likewise, FIG. 7B illustrates a view from the left camera in which the portions of the view 722 corresponding to the outside of the vehicle are obfuscated.

As can be seen in FIG. 7A, a zone-based configuration of a privacy mode may obfuscate a view of the outside of a vehicle that is already obfuscated by a person, at least for some of the image frames. It may be desired, however, to leave the portion of the FOV corresponding to a driver's face unobscured. This may be achieved by combining an object-based privacy setting. In the example shown in FIG. 7B, a privacy mode of "none" may be set for the driver's face 702 and for the passenger's face 704. Furthermore, this privacy setting may be configured to take priority over the privacy mode of "scrambled" that is associated with the window regions.

Configurable Privacy Settings

As illustrated in the previous examples, a device may be configured such that different privacy modes are associated with different portions of a combined FOV of a device. For example, each privacy mode may be associated with a video stream, with a portion of a FOV of the video stream, a portion of each of more than one video stream, and the like. Similarly, each privacy mode may be associated with an object that may be tracked in one or more video streams. In addition, each privacy mode may be associated with a triggering event. In some embodiments, a triggering event may be associated with a time interval (e.g. 3 minutes starting 2 minutes before the triggering event).

Each collection of privacy mode, location (portion of a field of view and/or object), and triggering event, may be considered a "privacy setting." In addition, the privacy settings may have a priority or other means of indicating that one privacy setting may take precedence over others. In some cases, a privacy setting may include an implied value. For example, a privacy setting that does not have a defined triggering event may be applied at all times that the device is operable, subject to other privacy settings having a higher priority.

Figure 8A:
FIG. 8A illustrates an example of an image with segmented portions in accordance with certain aspects of the present disclosure.
Figure 8B:
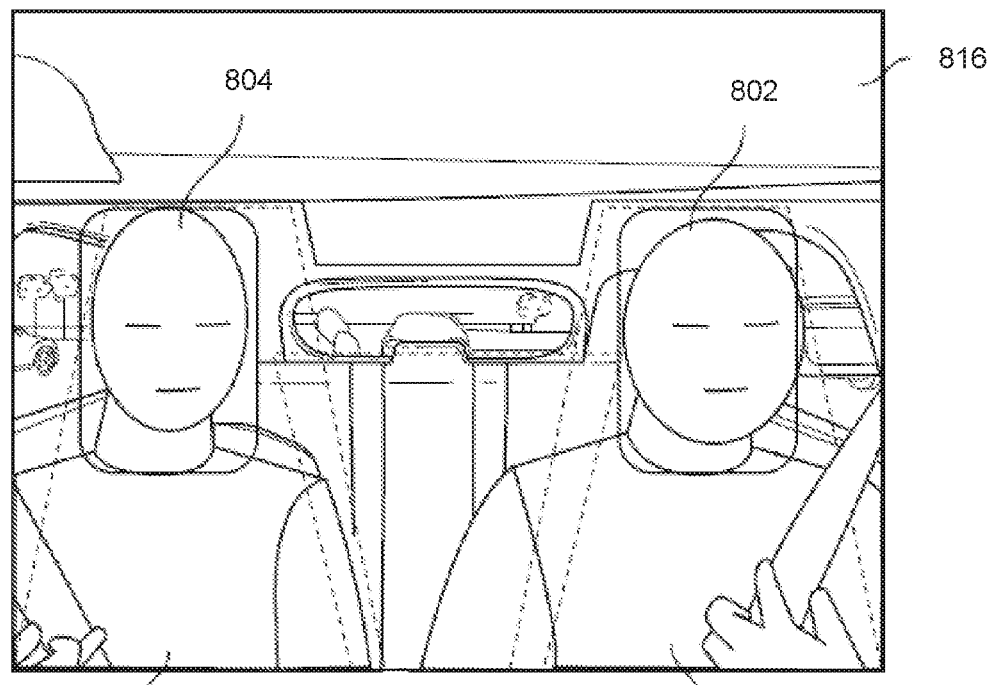
FIG. 8B illustrates an example of a modified image with segmented portions in accordance with certain aspects of the present disclosure.

As configuration of privacy settings may be cumbersome, may have unintended consequences, and/or may be time-consuming, certain aspects of the present disclosure are directed to a user interface. One aspect of a user interface may include a pre-segmentation of an image. For example, as shown in FIG. 8A, a driver seat region 818, a passenger seat region 812, a back seat zone 814, a roof region 816, and window regions, may be indicated by different shapes. A driver, fleet manager, installer, or other authorized individual may view a pre-segmented image like the one shown in FIG. 8A to select regions and/or objects for a given privacy setting. Upon selecting one or more regions and/or objects, the operator may be given a choice of privacy modes (which may include "scrambled," "none," and others as described in the next section. The user may further select a triggering event and a priority.

Figure 7C:
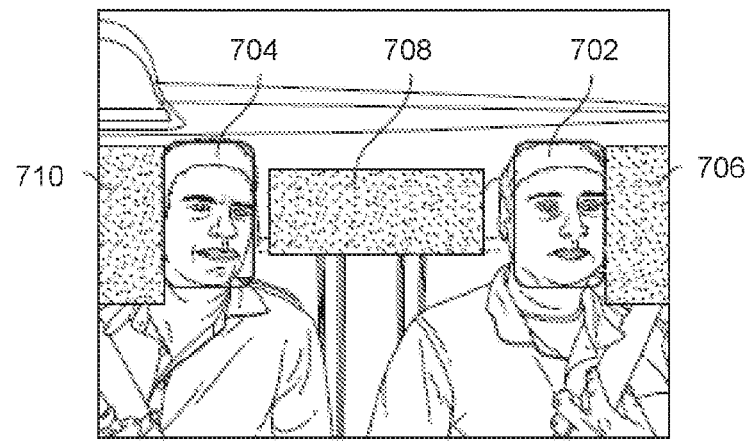
FIG. 7C illustrates another example of an image that has been modified in accordance with certain aspects of the present disclosure.

For example, to achieve the privacy configuration illustrated in FIG. 7C, the user may select the three window regions, a "scrambled" privacy mode, and a priority of "2" as a first privacy setting. The user may additionally select the two faces (driver face 802 and passenger face 804), a "none" privacy mode, and a priority of "1" as a second privacy setting. The user may further customize the pre-selected face objects to scale them down by 25% to achieve a tighter fit. This may be accomplished, for example, by pressing on both faces in the image illustrated in FIG. 8A when displayed on a smartphone, tablet, or other touch sensitive display, then holding down on a corner of one of the boxes and dragging it towards the center of the box, until the desired tightness is achieved. Reducing the size of the object may be useful in this example as the user may not want to inadvertently incorporate portions of the outside view that may surround the driver's face.

Similarly, rather than using substantially rectangular boxes as illustrated in FIG. 8A, a system may pre-segment an image with curved and/or angled bounding edges corresponding to a shape of a potential object of interest.

As there may be many objects in a view of a camera, certain aspects of the present disclosure are directed to intelligent pre-segmentation of an image based on previously collected statistics. For example, video data collected at the device, or at a similar device, might indicate that the extent of a FOV that may be considered a back-passenger area, based on previously observed locations of passengers. In another example, a portion of an inward facing camera corresponding to a child's car set may be a pre-segmented portion of the image.

The techniques described above may facilitate a configuration of privacy settings. In some cases, a user may configure privacy settings without having access to an unmodified image. In one example, the background image shown in FIG. 8A may itself be considered private. According to certain aspects, wire frame or stick-figure representations of objects may be used in place of the image. FIG. 78 illustrates an example of a user interface for configuring privacy settings that uses wire frames to indicate different objects and regions in a camera view. As in FIG. 8, different regions (a driver seat region 818, a passenger seat region 812, a back seat region 814, and a roof region 816) and objects (driver face 802 and passenger face 804) may be pre-segmented to facilitate the specification of privacy settings.

Without configuration, each desired combination of privacy settings may entail the creation of a new product. For example, without an ability to configure the privacy mode of an inward-facing camera, a user that has a privacy concern with an inward facing camera may opt for a version of a product that does not include the inward facing camera. By enabling the configuration of privacy settings, a user may change privacy settings at different times without the cost of switching out device hardware. In addition, the costs of producing devices having a variety of privacy configurations may be lessened. If the cost of including an unused camera is low, for example, it may be cost-effective to mass produce a device that includes cameras and other sensors that the customer does not intend to use, rather than produce smaller batches of multiple products that differ in the number of cameras.

Other forms of privacy configuration may include manual interventions. For example, a user may cover a camera with a lens cap at a certain time. Likewise, a lens cap may be applied to a camera in an automated fashion. Manual means of achieving a privacy mode may provide more certainty that a sensitive region of a combined field of view is kept private. However, manual means may also be susceptible to other technical challenges. For example, a lens cap or cap positioning system might break. In addition, methods that rely on covering a camera lens may be limited in their ability to adjust the privacy settings of a portion of a given video stream.

While the above User Interface examples were described as useful for configuring a privacy setting or a set of privacy settings, the same or a similar User Interface could be used to show the user how privacy is being (or has been, or will be) applied to an image. In one example, as discussed above, an LED might be used to indicate if a privacy mode is enabled or disabled. Considering that a privacy configuration may include a hierarchy of privacy settings, a user may see the effect of the totality of privacy settings in combination.

A configuration user interface may be available to a truck driver via a touch screen on a smartphone, tablet, or integrated within a vehicle. Alternatively, or in addition, a configuration and/or display user interface may be available to an operator, such as a fleet manager, at a remote location. In some cases, a privacy configuration (which may comprise multiple privacy settings) that is common for a given customer type may be selected by a user or pre-loaded with a device or system. In some embodiments, a pre-loaded privacy configuration may be further refined by a driver, fleet manager, or other authorized person.

In some embodiments, a privacy configuration may include an object, such as "driver" which may have a different typical location depending on a country of use. In this case, a GPS signal, or the like, may be used to assign a selected "driver" object to the correct side of the vehicle.

In some embodiments, a user may configure multiple sets of privacy configurations. A privacy configuration may be selected by the system based on a GPS or some other means of establishing a location. For example, a truck fleet may operate vehicles in Europe, and different European countries may have different laws and/or customs regarding privacy for vehicles. In this example, an enabled system may implement a privacy configuration appropriate to each country that the truck enters.

In some embodiments, a privacy mode may be configured by a verbal command. In one example, a person in a cab of a vehicle, or in a room of a house, may utter a phrase such as "privacy please." In this example, the IOT may locate the source of the speaker, identify the face of the speaker, and then configure a new privacy setting to modify the portion of the image corresponding to the face of the speaker. Voice localization may be performed with beam forming. In some examples, voice localization may be augmented with face detection to identify which person may have uttered the phrase. In some embodiments, the privacy setting may remain active until another phase is uttered.

In some embodiments, a privacy mode may be applied to audio signals. Considering the example illustrated in FIG. 5B, a system may be further configured so that audio signals emanating from passenger seat regions 512 or 514 are selectively filtered or cancelled. In this configuration, an IOT device that may collect audio data may still filter out certain private conversations, such as conversations between passengers.

In addition to providing privacy, audio cancellation from certain areas may make other audio signals relatively more intelligible. In some applications, a use may apply an audio privacy feature at a later time so that the relevant audio signals are more easily discerned. In one example, an IOT device in a living room may capture a view of a stereo system. A person reviewing the video may "visually mute" the stereo by clicking on the portion of the image corresponding to the stereo speakers.

Privacy Modes

A privacy setting may include a privacy mode. Several privacy modes are contemplated. Three privacy modes are illustrated in FIG. 5B. As described above, in this example a "none" privacy mode was selected for the driver seat region 518 and for the visible window regions 506, 508, and 510. A "scrambled" privacy mode was selected for the passenger seat regions 512 and 514, and a "black" privacy mode was selected for the interior roof region 516. Additional privacy modes are contemplated, including "blurry," "disabled," and "stick-figure." Audio privacy modes may include "distorted," "text-to-speech," "translated," and the like.

A privacy mode of "none" may indicate that the pixels in the corresponding region should appear substantially the same as they would appear if no privacy modifications were applied.

A privacy mode of "scrambled" may indicate that the pixels in the corresponding region should appear substantially similar to random noise. The pixels in a scrambled portion of an image may be based on the original pixel values and may be transformed according to a scrambling function. In some embodiments, modified portions of a video recording that were scrambled may be recoverable. For example, original pixel values may be multiplied by a sequence of pseudo-random values, or otherwise transformed according to a deterministic function of a sequence of pseudo-random values. To recover the original video, an authorized user may have a value of a seed that was used to generate the pseudo-random values in the present example. With access to the value of the seed that was used in the scrambling of the image, and with knowledge of the source of the pseudo-random values, the authorized user may be able to divide the scrambled pixels by successive values of the known random number generator, starting with the random seed. In some cases, a secondary error correction step may be applied to correct the images at ambiguous points. In these examples, the seed value may be considered a type of encryption key. In some embodiments, an encryption key may be used that corresponds to a password chosen by a relevant person. For example, a driver may have created a key which may be used to encrypt or decrypt video associated with an inward facing camera. In the aftermath of an accident, a driver may choose to share the encryption key with another party, such as a fleet manager, law enforcement authorities, and the like.

A privacy mode of "black" may indicate that the pixels in the corresponding region may be set to a uniform value or may be ignored. For example, if the left half of an image is set to "black" the system 100 may save the right half of an image along with an indicator of a horizontal pixel value to the left of which the video data should be ignored. Ignored pixel values may be read from a sensor and dropped. In some embodiments, ignored pixel values may never be read from a sensor.

A privacy mode of "blurry" may indicate that the pixels in the corresponding region have been blurred, for example, by convolving the region with a two-dimensional Gaussian. The appearance of objects within a "blurry" region may be blurred such that the rough shape of an object may be discernible, but certain features, for example, features characterized by a particular pattern of high-contrast edges, may not be unrecognizable.

Figure 9B:
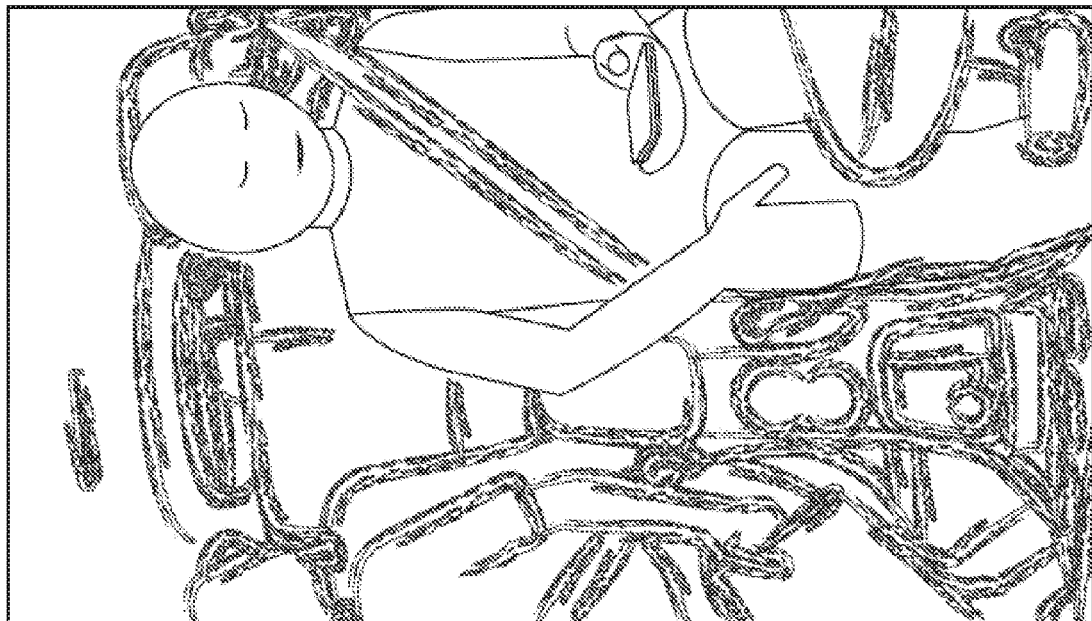
FIG. 9B illustrates an example of an image that has been modified with stick-figure representation in accordance with certain aspects of the present disclosure.
Figure 9A:
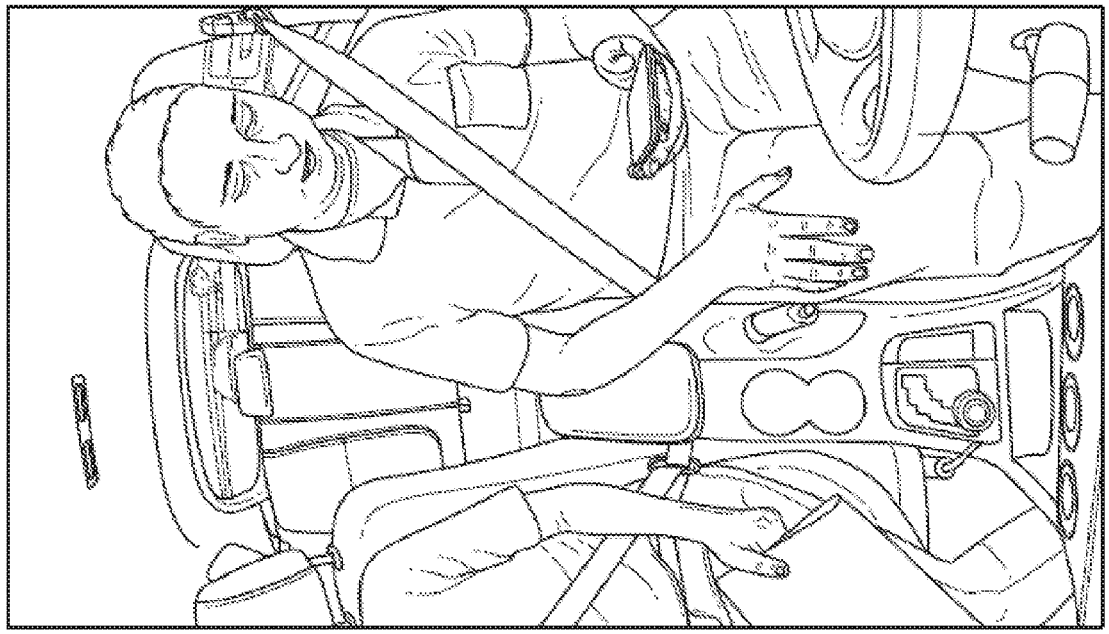
FIG. 9A illustrates an example of an image captured by an inward-facing camera in accordance with certain aspects of the present disclosure.

A privacy mode of "stick-figure" may indicate that the objects identified in the corresponding region may be replaced by stick-figure representations. One example of a "stick-figure" representation is illustrated in FIG. 9A and FIG. 9B. The original image in FIG. 9A has been transformed so that a stick-figure representation of people and relevant object edges are outlined. A stick-figure representation may be useful for ADAS and autonomous driving systems, for example, to track or monitor the attentiveness of a driver.

A "disabled" privacy mode may correspond to a camera that will not turn on, will not consume power, and the like. Unlike a "black" or "scrambled" privacy mode, a "disabled" privacy mode may not capture and/or record any video until the "disabled" setting is changed. As such, a video from a camera that has been "disabled" may not be recoverable from a time prior to a triggering event that removes the "disabled" setting. In some embodiments, a device may be configured so that a disabled camera may only be turned on by the original purchaser or designated agent.

A "disabled" privacy mode may be chosen for reasons unrelated to privacy. For example, an IDMS may be configured to disable a camera based on memory storage capacity. For example, if an IDMS device is nearing a memory storage limit, it may be configured to disable one or more cameras. This may extend the amount of recorded video from other cameras that may be stored. Similarly, an IDMS device may be affixed to a vehicle that is in storage, undergoing repairs, or out of commission for some other reason.

In addition to modifying pixel values, certain aspects of the present disclosure may be directed to replacing pixel values with inferred data, as described in the next section. In this case, a privacy mode may be set to "inferred." A "stick-figure" representation may be considered a type of "inferred" privacy mode.

Storage of Inferred Data

Certain aspects of the present disclosure are directed to processing video data on a device and storing inferred data rather than pixel values. For example, the disclosed system 100 monitors the attentiveness of the driver. In addition, the disclosed system 100 maintains privacy regarding the driver's identity. In accordance with certain aspects of the present disclosure, a portion of an image corresponding to a driver may be replaced with inferred data describing aspects of the driver's attentiveness. As with the "stick-figure" privacy setting illustrated in FIG. 9B, the video data from an inward-facing camera may include a set of parameters describing the driver's gaze direction, position of hands, and the like. Likewise, the data may be reduced to a set of binary indicators, such as an indicator of whether the driver is looking in the direction of the road, whether the driver has a hand on the steering wheel, and the like.

In another example, a system 100 may be configured to verify a match between a driver and a locally stored database corresponding to previous views of a portion of a driver. For example, the device may be configured to compute a feature vector of the driver based on processing an image from an inward-facing camera through a neural network trained to perform a face verification task. A feature vector may be stored in a local memory, in which the feature vector may correspond to values of certain nodes in the face verification network based on a portion of an image received from an inward facing camera. At a later time, the device may process the face verification network on a new image from the inward facing camera. The device may then store an indication of whether the new image contains a match with a previously viewed person. In this example, rather than storing image pixels that may be used to identify the driver, the system 100 may only store an indication that the current driver is likely the same person that was observed at a second time. In one example, a truck may be driven by a driving team, consisting of a Driver A and a Driver B. According to certain aspects of the present disclosure, a system 100 might store a log indicating whether Driver A or Driver B was driving, but the correspondence of the label Driver A (and the label Driver B) with a particular person may be obfuscated.

In another example, a driver may present a QR code to an inward facing camera. According to certain aspects of the present disclosure, a system 100 might store data inferred from the QR code rather than the associated image. In one example, a driver may present a QR code to an inward-facing camera such that the QR code is in the FOV and the driver's face is also in the FOV. In this example, the QR code data may be inferred from the video image, which may include a name of the driver, an indication of the cargo, and the like. The device may then store these inferred values but may discard the video data from the camera, as per desired privacy settings.

As with other priority settings described above, the storage of inferred data may be modified based on other priority settings. In one example, a face verification system may be used to verify that a single driver has been in the driver seat for a period of time. A first privacy setting may indicate that the portion of the FOV associated with the driver should be "black" with a priority of "3." A second privacy setting may indicate that the portion of the FOV associated with the driver should be "inferred" with a priority of "2." A third privacy setting may indicate that the portion of the FOV associated with the driver should be set to "none" with a priority of "1," and additionally having a triggering event, where the triggering event is a failure of a face verification system to match the current driver with a previously viewed driver.

In one embodiment, a device may be configured to maintain a database in accordance with configured privacy settings. Continuing with the present example, upon detecting that an image of a driver does not match a previously observed driver, a new image and/or new feature vector may be stored in a local database. In one example, the storage of additional feature vectors may improve the robustness of a face verification system. Alternatively, or in addition, a new image may be identified as an alert that is communicated to a fleet manager or other interested party. The fleet manager, for example, may then request to view the corresponding image to make a judgement as to whether the face verification system made an error or whether there is a new driver in the truck.

Robustness to Errors

Automated methods of modifying an image may be prone to errors. Certain aspects of the present disclosure are directed to improving robustness to errors. Continuing with the present example, a system may be configured so that video data from an inward-facing camera is not recorded to memory, not transmitted to another device, etc., based on whether the driver is verified as a match to a driver observed at an earlier time. The face verification system may make errors which may lead to a compromise of the driver's privacy. For example, the truck may encounter an unusual lighting condition, or the driver may orient his or her face in a way that confuses the face verification network.

According to certain aspects, modules that may be used in privacy settings (such as a face verification module, a gaze direction module, and the like), may include error robustness measures that are particular to the module. In a face verification module, for example, a system may not consider a face verification error as a "triggering event" unless certain other conditions are met. Additional conditions may include that the face verification infers a mismatch on a certain number or percentage of frames.

In another example, an inward facing camera may be enabled with a privacy setting corresponding to a driver's face. While the intention may be for the driver's face to be scrambled, for example, in each image, a face detection module may fail for one or more frames. According to certain aspects, the device may be configured to infer a "tube" of image locations across a time-ordered set of images. The tube may pass through each detected face location and may interpolate between the detected images. In addition, the tube may expand the area of the interpolated locations to further safeguard a driver's privacy. Alternatively, for each frame that the face detection module does not reach a threshold of confidence, the device may scramble or otherwise obscure a larger portion of the image, which may be, for example, the entirety of the frame.

Figure 10C:
FIG. 10C illustrates an image taken at a later time, after the passenger had returned to the passenger area, when the passenger was exhibiting gestures consistent with argumentative or threatening behavior directed at the driver in accordance with certain aspects of the present disclosure.
Figure 10B:
FIG. 10B illustrates an image taken at a time that a passenger attempted to enter the front area of the mini-van, which may be considered a restricted driver area in accordance with certain aspects of the present disclosure.
Figure 10A:
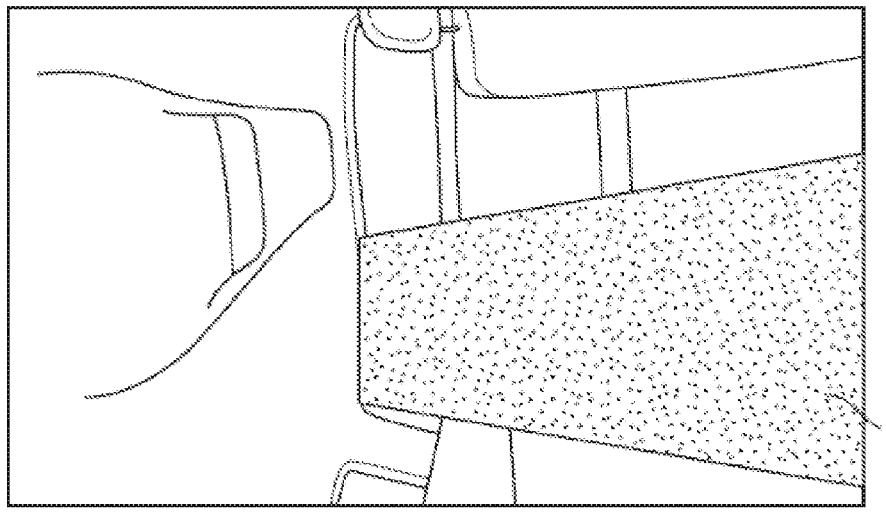
FIG. 10A illustrates an example in which a ride-share passenger is seated in a back seat of a mini-van in accordance with certain aspects of the present disclosure.

In addition to errors of misdetection, misverification, and the like, an active privacy system may be prone to errors relating to the detection of certain temporal events. In one example, a privacy setting may indicate a "scrambled" privacy mode triggered on a passenger entering the back seat of a car. An analysis module, such as a recurrent neural network, may be configured to detect a passenger entering a back seat of a car as a triggering event. FIG. 10A illustrates an example in which a ride-share passenger is seated in a back seat of a mini-van. In this example, the ride-share passenger was detected entering the mini-van and the corresponding passenger seat region 1012 is therefore scrambled according to a privacy setting.

In some instances, a neural network (or other visual analysis engine) may fail to detect an event. For example, a neural network trained to detect a passenger entering the back seat of a vehicle may not have been exposed to many training examples in which a passenger enters a vehicle from the driver's side. Due to the paucity of training examples, the neural network may often fail to detect when passengers enter from the driver's side.

According to certain aspects, a triggering event may be considered an appearance of an object within a portion of an image. In the present example, a user may set a triggering event as "passenger enters back seat of car." In accordance with certain aspects of the present disclosure, an object detection neural network may be used to detect people in the back seat of a car. As with a face detection network, this network may also have errors. Still, an object detection neural network that has been trained to detect people in the back seat of a car may have relatively more training examples compared with a neural network trained to detect a short-duration temporal event such as entering a car. As such, a device may be configured to detect a state "people in back seat of car" and use that to infer a change of state at an earlier time when the module consistently detected that there were no people in the back seat of the car.

In some embodiments, a privacy setting may be configured for a particular state. A state, such as "have passenger" may correspond to a triggering event "passenger enters car." In this case, a privacy setting associated with a state may be applied forward and backward in time until either a different state is consistently recognized, a triggering event corresponding to a change of state is recognized, or a combination.

Continuing with the present example, a second privacy setting may indicate a "none" privacy mode that may be triggered by a passenger entering a restricted driver area and/or becoming argumentative with the driver. FIG. 10B illustrates an image taken at a time that a passenger attempted to enter the front area of the mini-van, which may be considered a restricted driver area. FIG. 10C illustrates an image taken at a later time, after the passenger had returned to the passenger area, when the passenger was exhibiting gestures consistent with argumentative or threatening behavior directed at the driver. A neural network (or a branch of a neural network, etc.) may be trained to detect a passenger entering a driver area. These events may be so unlikely, however, that the neural network may not have enough training data to achieve satisfactory recognition performance on new events. For example, the neural network may have never been exposed to an image such as the one shown in FIG. 10B, and may therefore fail to recognize it as an attempt by a passenger to enter a restricted driver area. For example, over several images corresponding to the event, the neural network may have output a maximum probability of a driver area intrusion event as 0.25. The privacy setting may have been configured, however, such that the detection of the triggering event corresponds to a probability output above a threshold of 0.4. Since the neural network output a lower value, the system may miss the driver area intrusion event.

According to certain aspects, the neural network (or another neural network, a separate branch of the same neural network, etc.) may correctly recognize that the passenger was arguing with the driver at a later time, such as the time illustrated in FIG. 10C. Upon recognizing this event, the system may retroactively lower thresholds for other event detection outputs. In one example, the system may retroactively lower threshold for event detection outputs that may be considered more likely given the occurrence of the detected event. In this example, the threshold for detecting that driver area intrusion event may be reduced to 0.2 for a period extending 10 minutes before and after the event "passenger arguing" event. Under this adjustment, the privacy modifications applied to the image data around the time of the event illustrated in FIG. 10B may be reversed.

Automatic Driver Verification

Figure 11:
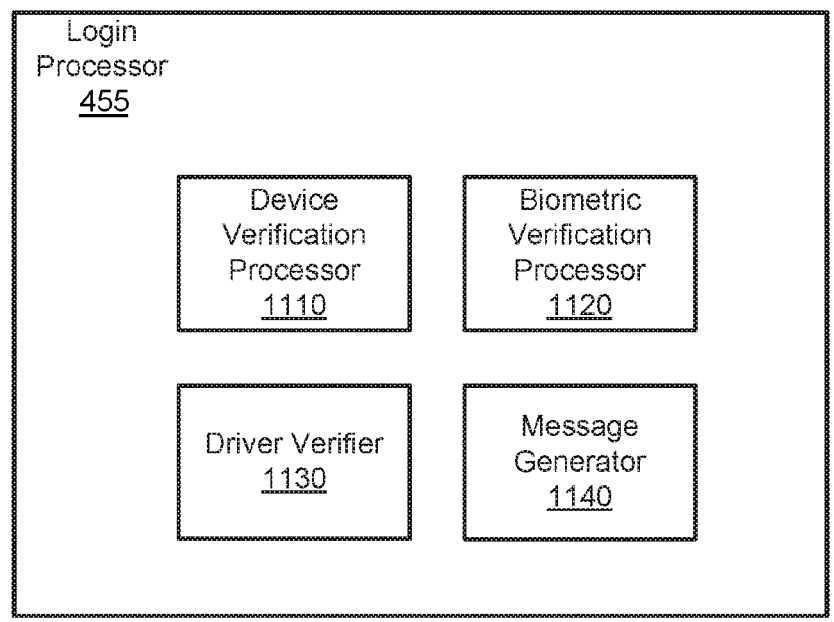
FIG. 11 illustrates a block diagram of a login processor of FIG. 4 in accordance with certain aspects of the present disclosure.

Referring to FIG. 11, illustrated is a block diagram of a login processor 455 of FIG. 4 in accordance with certain aspects of the present disclosure. In one embodiment, the login processor 455 includes a device verification processor 1110, a biometric verification processor 1120, a driver verifier 1130, and a message generator 1140. These components may be embodied as hardware, software, firmware, or any combination thereof. These components operate together to verify whether a driver of a vehicle is an authorized driver or not, based on a device attribute indicative of a beacon device 170 and a personal attribute indicative of a driver of a vehicle. In other embodiments, the login processor 455 includes fewer, more, or different components than shown in FIG. 11.

The device verification processor 1110 is a component that obtains a device attribute of a beacon device 170, and determines whether the driver is one of authorized drivers of the vehicle. As described above with respect to FIG. 4, a driver of a vehicle is expected to carry or wear a beacon device 170, which is associated with a distinct device attribute. The device attribute indicates an associated beacon device 170. A beacon device 170 is a device indicating a driver in possession of it is one of authorized drivers of a vehicle. For example, a beacon device 170 is a short range wireless communication device (e.g., Bluetooth device, NFC badge, RFID badge, etc.). For another example, a beacon device 170 is an object showing an associated QR code. Wireless signals from the short range wireless communication device or QR code displayed indicates a device attribute. The device verification processor 1110 may detect the device attribute of the beacon device 170 based on the wireless signal received through the short range wireless communication device 108, a decoded QR code from the event detector 440, or a combination of them. Because the beacon device 170 is expected to be carried or worn by one or more authorized drivers of a vehicle, detecting of the device attribute of the beacon device 170 also indicates that the driver is a candidate driver from one or more authorized drivers authorized to have the beacon device 170.

The biometric verification processor 1120 is a component that obtains a personal attribute of the driver, and determines whether the driver is an authorized driver of the vehicle. The personal attribute indicates distinctive features of the driver. Examples of the personal attribute include biometric signatures such as detected voice pattern or detected face pattern. The biometric verification processor 1120 may be embodied as machine learning neural network. In some embodiments, the biometric verification processor 1120 obtains features of the voice pattern (e.g., accent, pronunciation, articulation, roughness, nasality, pitch, volume, and speed etc.) from the audio processor 420 or features of face pattern (e.g., outlines of face, nose, mouth, eyes, or a combination of them) from the image processor 430, and compares the obtained features with features stored by the client profile store 405 to identify the driver associated with the obtained features. In one aspect, the biometric verification processor 1120 performs face recognition to compare a number of features obtained by the image processor 430 with features of a plurality of authorized drivers. In another aspect, the biometric verification processor 1120 performs face verification to compare a number of features obtained by the image processor 430 with features of a particular candidate driver (e.g., a candidate driver associated with the beacon device 170). The face recognition may be performed by comparing a fewer number of features than the face verification. Hence, the face recognition may be performed faster than when all features are compared, but identification rate may be reduced. On the other hand, the face verification may be performed for a specific individual with more number of features or all features, thus identification rate may be improved than when fewer features are compared.

The driver verifier 1130 is a component that configures the device verification processor 1110 and the biometric verification processor 1120 to determine whether the driver is an authorized driver of the vehicle based on the device attribute and the personal attribute. For example, the driver verifier 1130 causes the biometric verification processor 1120 to perform a fast face recognition to determine whether the driver is one of the authorized drivers of the vehicle. In case the driver is not determined to be one of the authorized drivers from the face recognition, the device verifier 1130 determines whether the driver is one of the authorized drivers based on device attribute through the device verification processor 1110 and face verification through the biometric verification processor 1120. The driver verifier 1130 may verify the driver of the vehicle periodically, when a certain event is detected (e.g., when a certain button of the system 100 is pressed, when an engine starts, or when the vehicle travels over a predetermined speed), when prompted by a remote server 150, or any combination of them. An example process of verifying a driver based on the device verification processor 1110 and the biometric verification processor 1120 is provided with respect to FIG. 12 below.

The message generator 1140 is a component that generates an electronic report message according to verification of a driver from the driver verifier 1130. In one aspect, the message generator 1140 generates a successful login message, in response to determining that the user is an authorized driver. In another aspect, the message generator 1140 generates an alert message, in response to determining that the user is not one of authorized drivers of the vehicle. The alert message may include image data or video data of inward FOV including at least a face of the driver. The message generator 1140 may transmit the message to a remote server 150 through the long range wireless communication device 116. Alternatively, the message generator 1140 stores one or more messages by the memory 114. The stored messages may be later accessed by other devices or by the remote server 150.

In one aspect, the login (or verification of the driver) is performed with respect to a privacy mode. For example, in a full privacy mode, in which no cabin cameras are enabled or available, a driver may be verified based on RFID or Bluetooth (BT)/BT-LE of the beacon device 170. In a partial privacy mode, in which side cameras are enabled/available but not the inward facing camera, the driver may be verified based on a QR code, RFID, or BT/BT-LE. In a no privacy concern mode, in which both inward and side cameras are enabled and available, a driver may be verified based on QR code, RFID, or BT/BT-LE.

Figure 12:
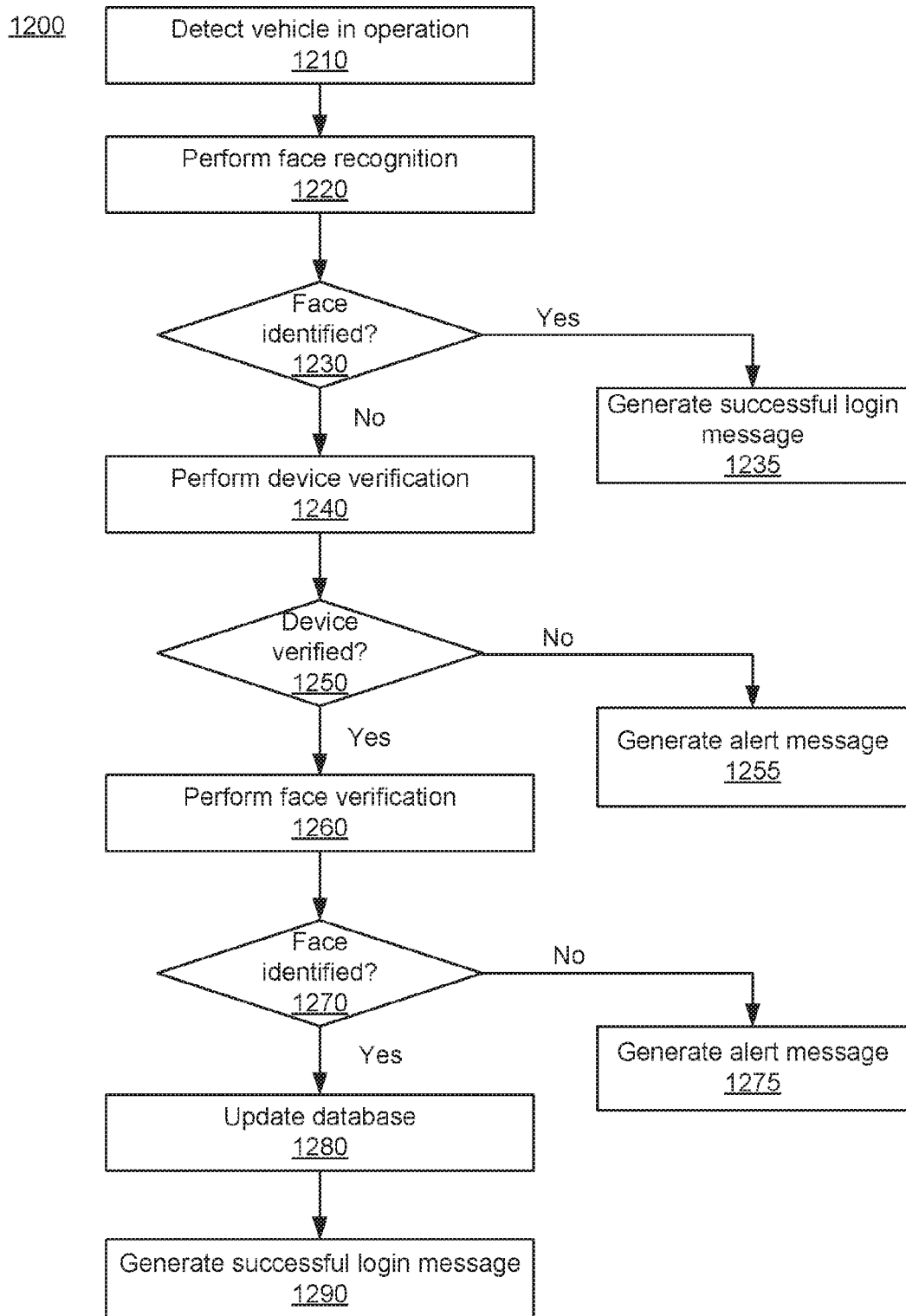
FIG. 12 illustrates an example flow chart of a process of verifying a driver of a vehicle by the SOC of FIG. 1 in accordance with certain aspects of the present disclosure.

Referring to FIG. 12, illustrated is an example flow chart of a process of verifying a driver of a vehicle by the SOC 110 of FIG. 1 in accordance with certain aspects of the present disclosure. In some embodiments, the process 1200 in FIG. 12 may be performed by other entities. In some embodiments, the process 1200 includes fewer, more, or different steps than shown in FIG. 12.

The SOC 110 detects 1210 the vehicle is operation, and starts the login process (or verification process). The login process starts when the device on a vehicle is in "LIVE" state. The SOC 110 may be in a "LIVE" state either on every Ignition ON of the vehicle or if the vehicle starts moving after a long Idle time (say >N hours).

The SOC 110 performs 1220 face recognition, if the inward camera is enabled/allowed in a vehicle. The SOC 110 may record/capture video/images to verify the captured face against the previously logged in drivers' face database if available. The SOC 110 determines 1230 whether a probable match is found. In response to verifying that a face of the driver matches a face image of one of authorized drivers, the SOC 110 generates 1235 a successful login message and may also generate a welcome voice prompt with the identified driver name played through the speakers on the system 100.

If no probable match is found from the face recognition, the SOC 110 performs 1240 device verification based on device attributes. The SOC 110 may prompt the driver either by a proper voice instruction or generating "BEEP/BLOOP" sounds to authenticate him/herself using their primary login mode if driver intervention is required. If the primary login mode doesn't require any driver intervention, then prompts may be disabled. The SOC 110 may allow a predetermined time duration to search for and perform device verification of a beacon device 170. The SOC 110 determines 1250 whether the beacon device 170 is associated with a candidate driver from the authorized drivers authorized to have the beacon device 170.

There can be scenarios where the device may detect multiple unauthorized beacon IDs coming from different RF sources/devices. To filter them at device level, each intended beacon ID has a specific hash embedded in them. If the SOC 110 finds multiple intended beacon IDs, then the SOC 110 may choose to resolve by either face verification/recognition if inward camera is enabled, or transmit the detected beacon IDs to a remote server 150, by which a proper beacon ID may be identified from multiple beacon IDs.

In response to failing to determining that the beacon device 170 is associated with one of authorized drivers, the SOC 110 generates 1255 an alert message.

In response to determining that the beacon device 170 is associated with a candidate driver from the authorized drivers, the SOC 110 performs 1260 face verification to determine 1270 whether a face of the driver matches a face image of the candidate driver having the beacon device 170. In one aspect, the face verification is performed to compare features of the driver in the vehicle with features of a face image of the candidate driver. In one approach, there may be multiple drivers when the vehicle is parked at the fleet's garage. The face verification may be performed in response to determining that the vehicle travels over a predetermined speed or over a predetermined distance after the time of vehicle starts. Accordingly, face verification may be performed without multiple drivers nearby.

In response to determining that the face of the driver does not match the face image of the candidate driver having the beacon device 170, the SOC 110 generates 1275 an alert message.

In response to determining that the face of the driver matches the face image of the candidate driver having the beacon device 170, the SOC 110 updates 1280 the database to add the new face image of the driver, and generates 1290 a successful login message.

The successful login messages or alert messages may be transmitted to a remote server 150.

Figure 13:
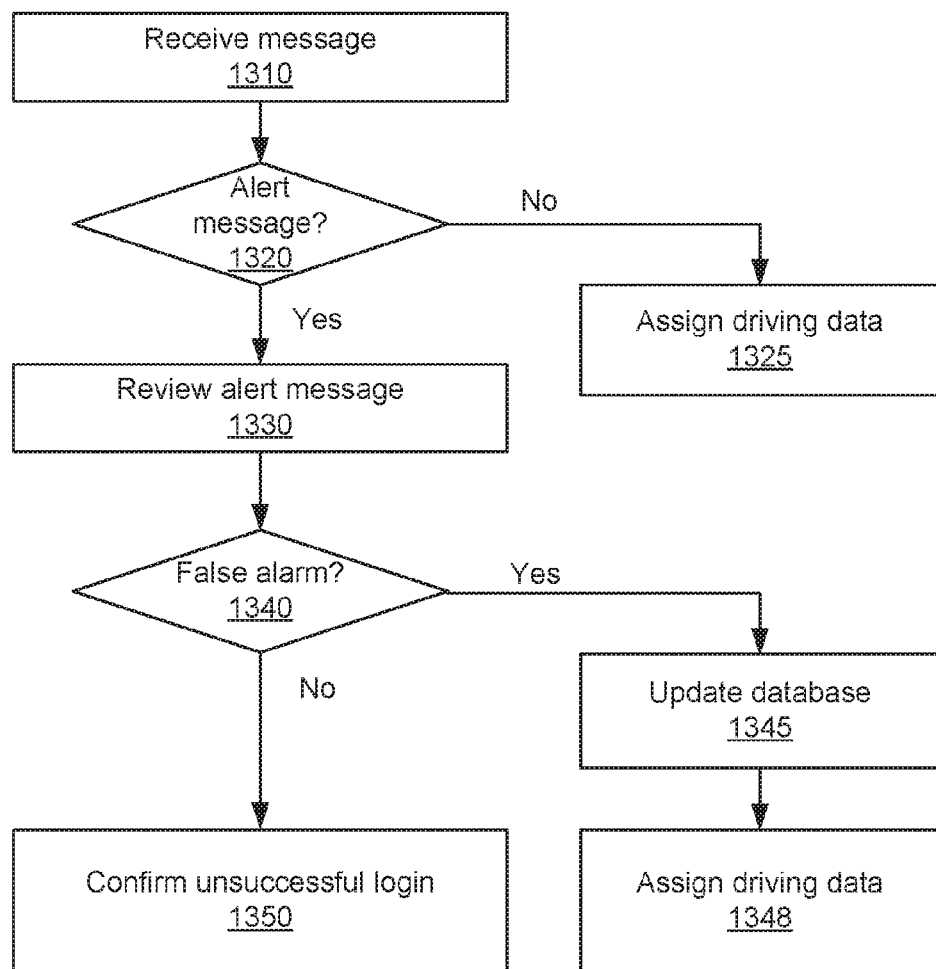
FIG. 13 illustrates an example flow chart of a process of verifying a driver of a vehicle by a remote server in accordance with certain aspects of the present disclosure.

Referring to FIG. 13, illustrated is an example flow chart of a process 1300 of verifying a driver of a vehicle by a remote server 150 communicatively connected to the system 100 through a network 160 in accordance with certain aspects of the present disclosure. In some embodiments, the process 1300 in FIG. 13 may be performed by other entities. In some embodiments, the process 1300 includes fewer, more, or different steps than shown in FIG. 13.

The remote server 150 receives 1310 a message from the SOC 110, for example, through a network 160. The remote server 150 determines 1320 whether the received message is an alert message or not. Responsive to determining that the message is a successful login message or is not an alert message, the remote server 150 assigns 1325 driving data, indicating that the authorized driver identified by the SOC 110 is driving the vehicle.

In response to determining that the received message is an alert message, the remote server 150 automatically reviews 1330 the alert message, or prompts a fleet manager to review the alert message to determine 1340 whether the alert message is a false alarm. The fleet manager may view image or video of the driver in the vehicle attached to the alert message, and determine whether the driver is authorized to drive the vehicle or not. In response to determining that the alert message is a false alarm, the remote server 150 updates 1345 the remote database, and assigns 1348 the driving data, indicating that the authorized driver is driving the vehicle.

In response to determining that the alert message is not a false alarm, the remote server 150 or the fleet manager confirms 1350 unsuccessful login or unauthorized driving of the vehicle by an unauthorized driver. The fleet manager may further take appropriate actions to stop the unauthorized driver.

Advantageously, the disclosed verification of a driver based on device attribute and personal attribute allows capturing driver's identity without any intervention from driver using face verification/recognition and beacons. In addition, the disclosed verification allows accuracy and efficiency of verifying the driver to be improved without an additional expensive hardware (e.g., finger print sensor or other biometric sensors). Furthermore, the disclosed verification can successfully verify the driver, even when multiple drivers are nearby. Specifically, verifying a driver based on the beacon device 170 alone may not be feasible or sufficient when multiple drivers are near a vehicle in a parking garage, or when multiple drivers of a team are located within the same vehicle. By verifying the driver based on the device attribute in conjunction with the personal attribute, the driver can be successfully identified even when multiple drivers are nearby. Moreover, a driver's face database can be automatically updated using a beacon ID (e.g., device attribute) to face association. Additionally, a message can be provided to a remote server 150 to notify an unauthorized driver driving the vehicle.

Joint Client and Cloud Processing

According to aspects of the present disclosure, recorded video may be processed on the device. Alternatively, or in addition, recorded video may be processed in the cloud. In some embodiments, a device in accordance with the present disclosure may be called a client. The client and cloud may jointly process the data obtained at the client device. In one example, sensor data may be segmented into a subset of frames. The subset of frames may be sent the cloud where it may be processed by a cloud inference engine. The results of the cloud inference engine may then be sent back to the client device. Concurrently, the sensor data obtained on the device may be processed locally at a client inference engine. The results from the cloud may be combined with the results of the inference engine on the client device to obtain the inference results that may be used by the client device. In the present example, the cloud may provide additional computation resources to those at the client. Several methods of leveraging the additional computational resources of the cloud are contemplated, as described in PCT Patent Application No. PCT/US16/58723—"Joint Processing for Embedded Data Inference," filed Oct. 25, 2016, which is incorporated herein by reference in its entirety.

Data Storage

Certain aspects of the present disclosure are directed to modifying a video with respect to its storage location. Similar to privacy modes, which may refer to how a portion of a video may be modified, a "storage" setting may refer to a particular memory or location within a memory where a modified (or unmodified) image may be stored.

A "none" storage setting may indicate that the image data should not be stored in any location. This privacy setting may correspond to a physical lens cap being modified to cover a camera lens.

An "inference" storage setting may indicate that the image data should be received from a camera and used in an inference engine, but should not be subsequently stored in a device memory, should not be transmitted to a second device, and the like.

A "local" storage setting may indicate that the image data (which may be a modified version of the image data, such as "scrambled") should be stored locally in a device memory.

A "cloud" storage setting may indicate that the image data should be transmitted to a cloud server. A setting that visual data 'should' be stored in a location may be used to acknowledge that the storage of the data may be subject to system constraints and other privacy settings. For example, data that should be stored on the cloud may not be transmitted to the cloud if a wireless data connection is not available. In this case, the data may be cached in local memory and transmitted to a cloud server at a later time. Still, a wireless connection may not be reached before the locally stored data is overwritten by newly collected data.

In some embodiments, video data corresponding to portion of a video may be stored in a first memory under a first privacy mode (e.g. "none"), and video data corresponding to the same portion of video may be stored under a second privacy mode (e.g. "scrambled") at a second location. For example, unmodified video (privacy set to "none") may be stored at a local memory, but scrambled video may be stored on a cloud server. Alternatively, in accordance with certain aspects of the present disclosure, unmodified or substantially unmodified video may be stored on a remote server 150, and video data corresponding to the same portion of video may be stored in a modified form (e.g. "scrambled") in a local memory. This example may be useful if a system administrator does not want to have unscrambled video accessible from deployed devices in the field, but may still want access to unscrambled video data when logged in to a secure cloud server.

Various means of modifying a video are contemplated. As described above, a video may be "scrambled" with an encryption key. An encryption key may be used to encrypt video data in an enabled device prior to storage in local memory. The encrypted data may then be transmitted to a cloud server. At the cloud server, the encryption key may be used to return the video to an unmodified (or substantially unmodified) appearance. Accordingly, a privacy setting for a higher level of modification may be associated with a local memory storage nearer to the source of video data, and a privacy setting for a relatively lower level of modification may be associated with a remove storage location, such as a cloud server.

Various means for achieving an "inference" storage setting are contemplated. In one example, a data stream may be read from a camera sensor into a GPU memory where it may be processed by a neural network running on the GPU. In another example, the data stream may be read into a shared memory that may be accessed by the GPU and other compute engines, such as a CPU. In another example, the camera sensor data may be processed by a Digital Signal Processor (DSP), which may be configured to process a stream of inputs. For example, a DSP may be configured to process a video stream to detect objects.

According to certain aspects of the present disclosure, video data may be modified according to a desired privacy in "arrears." In one example, a video may be uploaded to a cloud that may include sensitive information. For example, the video may be from a front-facing camera in a vehicle and may include a view of a license plate of a nearby car. In this example, a fleet manager may create a new privacy setting directed to obfuscation of license plates in the local memory of a deployed device. This privacy setting may be communicated back to the device so that it may be included in future modifications. In addition, according to certain aspects, the privacy setting may be applied to other videos that may already be stored in the local memory of a deployed device.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions or program code stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a secure digital card (SD), USB storage device, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A system comprising:
a body mounted on a windshield of a vehicle;
a plurality of cameras coupled to the body, the plurality of cameras configured to capture surrounding views from the body, including an inward-facing camera configured to capture an image of a driver in a driver seat of the vehicle;
a device verification processor coupled to the body, the device verification processor configured to automatically determine, in a first setting of a privacy mode, when selected by the driver, a device attribute indicative of a beacon device attained by the driver in the vehicle in response to a determination that a personal attribute has no probable match; and configured to automatically determine, in a second setting of the privacy mode, when selected by the driver, the device attribute indicative of the beacon device without an attempted determination of the personal attribute;
a biometric verification processor coupled to the body, the biometric verification processor configured to determine, in the first setting of the privacy mode, the personal attribute indicative of the driver using a portion of the image by comparing the portion of the image to a portion of a previous image of the personal attribute of the driver stored in a database;
a driver verifier processor coupled to the body, the driver verifier processor configured to determine, based on the device attribute or the personal attribute in the first setting of the privacy mode or based on the device attribute without the personal attribute in the second setting of the privacy mode, whether the driver is an authorized driver of the vehicle; and a message generator processor coupled to the body, the message generator processor configured to transmit an electronic message indicating whether the driver is the authorized driver of the vehicle.

2. The system of claim 1, wherein one of the plurality of cameras captures an image of the driver in the vehicle.

3. The system of claim 2, further comprising:
a face detector communicatively coupled to the one of the cameras and the biometric verification processor, the face detector configured to detect a face of the driver in the image of the driver,
wherein the personal attribute comprises the detected face of the driver.

4. The system of claim 3, wherein the driver verifier is configured to:
determine whether the detected face of the driver matches any one of face images of a plurality of authorized drivers through face recognition.

5. The system of claim 4, wherein, in response to determining that the detected face of the driver does not match any one of the face images of the plurality of authorized drivers, the driver verifier is configured to:
identify a candidate driver authorized to attain the beacon device based on the device attribute; and
determine whether the detected face of the driver matches a face image of the candidate driver through face verification.

6. The system of claim 5, wherein the face verification analyzes more number of features of the face of the driver in the image than the face recognition.

7. The system of claim 5, wherein, the face verification is performed in response to determining that the vehicle moves at least a predetermined speed.

8. The system of claim 5, wherein, in response to determining that the detected face of the driver matches the face image of the candidate driver, the driver verifier is configured to:
update a database to add the image of the driver to the face images of the plurality of authorized drivers.

9. The system of claim 5, wherein, in response to determining that the detected face of the driver does not match the face image of the candidate driver, the message generator is configured to:
transmit, to a remote server, the electronic message indicating an unauthorized driver operating the vehicle.

10. The system of claim 1, further comprising:
a voice detector communicatively coupled to the biometric verification processor, the voice detector configured to detect a voice of the driver in the vehicle,
wherein the personal attribute comprises the detected voice of the driver.

11. The system of claim 1, wherein the device verification processor comprises:
a QR code detector, the QR code detector configured to detect a QR code of the beacon device to determine the device attribute.

12. The system of claim 1, wherein the device verification processor comprises:
a wireless transceiver, the wireless transceiver configured to detect an encoded wireless signal from the beacon device to determine the device attribute.

13. The system of claim 1, wherein the body comprises a detachable mount to couple or decouple the body from the windshield.

14. A method comprising:
determining, by a processor of a body mounted on a windshield of a vehicle and including an inward-facing camera, a setting for a privacy mode from a data storage;
responsive to determining that the privacy mode is in a first setting selected by a driver,
in response to a vehicle traveling over a predetermined speed, automatically determining, by the processor, a personal attribute indicative of a driver in the vehicle;
in response to determining that the personal attribute indicative of the driver does not match any of a plurality of authorized drivers, automatically determining, by the processor, a device attribute indicative of a beacon device attained by the driver; and
determining, by the processor, based on the device attribute and the personal attribute, whether the driver is an authorized driver of the vehicle;
responsive to determining that the privacy mode is in a second setting selected by the driver,
determining, by the processor, the device attribute indicative of the beacon device attained by the driver; and
determining, by the processor, based on the device attribute and without an attempted determination of the personal attribute, whether the driver is an authorized driver of the vehicle; and
transmitting, by the processor, an electronic message indicating whether the driver is the authorized driver of the vehicle.

15. The method of claim 14, further comprising:
detecting a face of the driver in an image of the driver in the vehicle; and
determining whether the detected face of the driver matches any one of face images of a plurality of authorized drivers through face recognition.

16. The method of claim 15, further comprising:
identifying, in response to determining that the detected face of the driver does not match any one of the face images of the plurality of authorized drivers, a candidate driver authorized to attain the beacon device based on the device attribute; and
determining whether the detected face of the driver matches a face image of the candidate driver through face verification.

17. The method of claim 16, wherein the face verification analyzes more number of features of the face of the driver in the image than the face recognition.

18. The method of claim 16, further comprising:
updating, in response to determining that the detected face of the driver matches the face image of the candidate driver, a database to add the image of the driver to the face images of the plurality of authorized drivers.

19. The method of claim 16, further comprising:
transmitting, to a remote server, the electronic message indicating an unauthorized driver operating the vehicle, in response to determining that the detected face of the driver does not match the face image of the candidate driver.

20. A system comprising:
a detachable body configured to be mounted on a windshield of a vehicle, the detachable body containing a plurality of apertures, the detachable body housing:
a plurality of video cameras located at the plurality of apertures, the plurality of video cameras configured to capture surrounding views from the detachable body, one of the plurality of video cameras at a first aperture of the plurality of apertures and on a first side surface of the detachable body facing a driver seat of the vehicle in response to the detachable body being mounted on the windshield of the vehicle, one of the plurality of video cameras at a second aperture of the plurality of apertures and on a second side surface of the detachable body facing outside of the vehicle through the windshield in response to the detachable body being mounted on the windshield of the vehicle; and
an event detector processor that causes the plurality of video cameras to begin recording in response to a presence of a passenger in the vehicle detected using an extracted feature or motion vector from an image processor coupled to the plurality of video cameras.

21. A machine-readable storage medium having computer-executable instructions stored thereon that, when executed by one or more processors, cause the one or more processors to perform operations comprising:
determining a setting for a privacy mode from a data storage, wherein the one or more processors is housed in a body mounted on a windshield of a vehicle and includes an inward-facing camera;
responsive to determining that the privacy mode is in a first setting selected by a driver,
in response to a vehicle traveling over a predetermined speed, automatically determining a personal attribute indicative of a driver in the vehicle;
in response to determining that the personal attribute indicative of the driver does not match any of a plurality of authorized drivers, automatically determining a device attribute indicative of a beacon device attained by the driver; and
determining based on the device attribute and the personal attribute, whether the driver is an authorized driver of the vehicle;
responsive to determining that the privacy mode is in a second setting selected by the driver,
determining the device attribute indicative of the beacon device attained by the driver; and
determining based on the device attribute and without an attempted determination of the personal attribute, whether the driver is an authorized driver of the vehicle; and
transmitting an electronic message indicating whether the driver is the authorized driver of the vehicle.

\* \* \* \* \*